US011061770B1

(12) United States Patent
Patel et al.

(10) Patent No.: US 11,061,770 B1
(45) Date of Patent: Jul. 13, 2021

(54) RECONSTRUCTION OF LOGICAL PAGES IN A STORAGE SYSTEM

(71) Applicant: EMC IP Holding Company LLC, Hopkinton, MA (US)

(72) Inventors: Dixitkumar Vishnubhai Patel, Monroe, NJ (US); James O. Owens, Nashua, NH (US)

(73) Assignee: EMC IP Holding Company LLC, Hopkinion (MA)

( * ) Notice: Subject to any disclaimer, the term of this patent is extended or adjusted under 35 U.S.C. 154(b) by 0 days.

(21) Appl. No.: 16/916,621

(22) Filed: Jun. 30, 2020

(51) Int. Cl.
*G06F 11/10* (2006.01)
*G06F 11/07* (2006.01)
*G06F 11/30* (2006.01)
*G06F 12/0813* (2016.01)
*G06F 12/0882* (2016.01)

(52) U.S. Cl.
CPC ...... *G06F 11/1068* (2013.01); *G06F 11/0772* (2013.01); *G06F 11/3034* (2013.01); *G06F 12/0813* (2013.01); *G06F 12/0882* (2013.01)

(58) Field of Classification Search
CPC ............. G06F 11/1068; G06F 11/0772; G06F 11/3034; G06F 12/0813; G06F 12/0882
See application file for complete search history.

(56) References Cited

U.S. PATENT DOCUMENTS

| 8,954,383 | B1 | 2/2015 | Vempati et al. |
| 9,003,227 | B1 | 4/2015 | Patel et al. |
| 9,104,675 | B1 | 8/2015 | Clark et al. |
| 9,778,996 | B1 | 10/2017 | Bono et al. |
| 10,210,048 | B2 | 2/2019 | Sancheti |
| 10,324,834 | B2 * | 6/2019 | Seo ..................... G06F 12/0246 |
| 10,474,367 | B1 | 11/2019 | Mallick et al. |
| 2013/0159603 | A1 * | 6/2013 | Whitney ............. G06F 11/1461 711/103 |
| 2014/0310499 | A1 * | 10/2014 | Sundararaman .... G06F 16/2308 711/203 |

(Continued)

OTHER PUBLICATIONS

G. Xu et al., "LIPA: A Learning-based Indexing and Prefetching Approach for Data Deduplication," Conference: 2019 35th Symposium on Mass Storage Systems and Technologies (MSST), May 20-24, 2019, 12 pages.

(Continued)

*Primary Examiner* — Kyle Vallecillo
(74) *Attorney, Agent, or Firm* — Ryan, Mason & Lewis, LLP

(57) ABSTRACT

An apparatus comprises a processing device configured to obtain a first logical page and to obtain a first namespace address corresponding to a second logical page from the first logical page. The processing device is further configured to obtain the second logical page based at least in part on the first namespace address and to identify a given entry of a plurality of entries of the second logical page based at least in part on index information contained in the first logical page. The processing device is further configured to determine that the given entry comprises data other than a second namespace address corresponding to the first logical page and to add the second namespace address corresponding to the first logical page to the given entry based at least in part on the determination that the given entry comprises data other than the second namespace address.

20 Claims, 18 Drawing Sheets

(56) References Cited

U.S. PATENT DOCUMENTS

| | | | | |
|---|---|---|---|---|
| 2016/0110249 | A1* | 4/2016 | Orme | G06F 11/1016 |
| | | | | 714/6.24 |
| 2017/0083237 | A1* | 3/2017 | Potash | G06F 8/44 |
| 2017/0083238 | A1* | 3/2017 | Potash | G06F 9/46 |
| 2017/0083434 | A1* | 3/2017 | Potash | G06F 9/38 |
| 2017/0083449 | A1* | 3/2017 | Potash | G06F 9/3824 |
| 2018/0060228 | A1* | 3/2018 | Arai | G06F 3/0608 |
| 2018/0121344 | A1* | 5/2018 | Seo | G06F 12/0246 |
| 2018/0189174 | A1* | 7/2018 | Chou | G06F 12/0246 |
| 2019/0114112 | A1* | 4/2019 | Lin | G06F 12/0284 |
| 2019/0205053 | A1* | 7/2019 | Nomura | G06F 3/0689 |
| 2019/0361611 | A1* | 11/2019 | Hosogi | G06F 3/0631 |
| 2020/0133541 | A1 | 4/2020 | Kleiner et al. | |
| 2021/0081325 | A1* | 3/2021 | Bradshaw | G06F 3/0656 |
| 2021/0081326 | A1* | 3/2021 | Curewitz | G06F 12/1036 |

OTHER PUBLICATIONS

NVM Express, "NVM Express, Revision 1.3," NVM Express, May 1, 2017, 282 pages.

Commvault, "Storage Policy (Snapshot)" https://documentation.commvault.com/commvault/v11/article?p=60105_1.htm, Sep. 12, 2019, 3 pages.

Oracle, "Managing Snapshots," https://docs.cloud.oracle.com/en-us/iaas/Content/File/Tasks/managingsnapshots.htm, 2020, 3 pages.

T. Finch, "Incremental Calculation of Weighted Mean and Variance," University of Cambridge Computing Service, Feb. 2009, 8 pages.

U.S. Appl. No. 16/260,660, filed Jan. 29, 2019, and entitled "System and Method for Aggregating Metadata Changes in a Storage System."

U.S. Appl. No. 16/861,986 filed in the name of Vladimir Shveidel et al. Apr. 29, 2020, and entitled "Lockless Metadata Binary Tree Access."

U.S. Appl. No. 16/862,733 filed in the name of Alexander S. Mathews et al. Apr. 30, 2020, and entitled "Finding Storage Objects of a Snapshot Group Pointing to a Logical p. In a Logical Address Space of a Storage System."

U.S. Appl. No. 16/862,735 filed in the name of Dixitkumar Vishnubhai Patel et al. Apr. 30, 2020, and entitled "Mapping Virtual Block Addresses to Portions of a Logical Address Space that Point to the Virtual Block Addresses."

U.S. Appl. No. 16/862,740 filed in the name of Rohit K. Chawla et al. Apr. 30, 2020, and entitled "Generating Recommendations for Initiating Recovery of a Fault Domain Representing Logical Address Space of a Storage System."

U.S. Appl. No. 16/863,433 filed in the name of Sorin Faibish et al. Apr. 30, 2020, and entitled "Cache Retention for Inline Deduplication Based on Number of Physical Blocks with Common Fingerprints Among Multiple Cache Entries."

U.S. Appl. No. 16/879,459 filed in the name of Yousheng Liu et al. May 20, 2020, and entitled "Reusing Overwritten Portion of Write Buffer of a Storage System."

U.S. Appl. No. 16/888,668 filed in the name of Kundan Kumar et al. May 30, 2020, and entitled "Selective Snapshot Creation Using Source Tagging of Input-Output Operations."

U.S. Appl. No. 16/897,388 filed in the name of Alex Soukhman et al. Jun. 10, 2020, and entitled "Garbage Collection in a Storage System at Sub-Virtual Block Granularity Level."

U.S. Appl. No. 16/907,560 filed in the name of Vamsi K. Vankamamidi et al. Jun. 22, 2020, and entitled "Regulating Storage Device Rebuild Rate in a Storage System."

U.S. Appl. No. 16/916,219 filed in the name of Vladimir Kleiner et al. Jun. 30, 2020, and entitled "Application Execution Path Tracing for Inline Performance Analysis."

\* cited by examiner

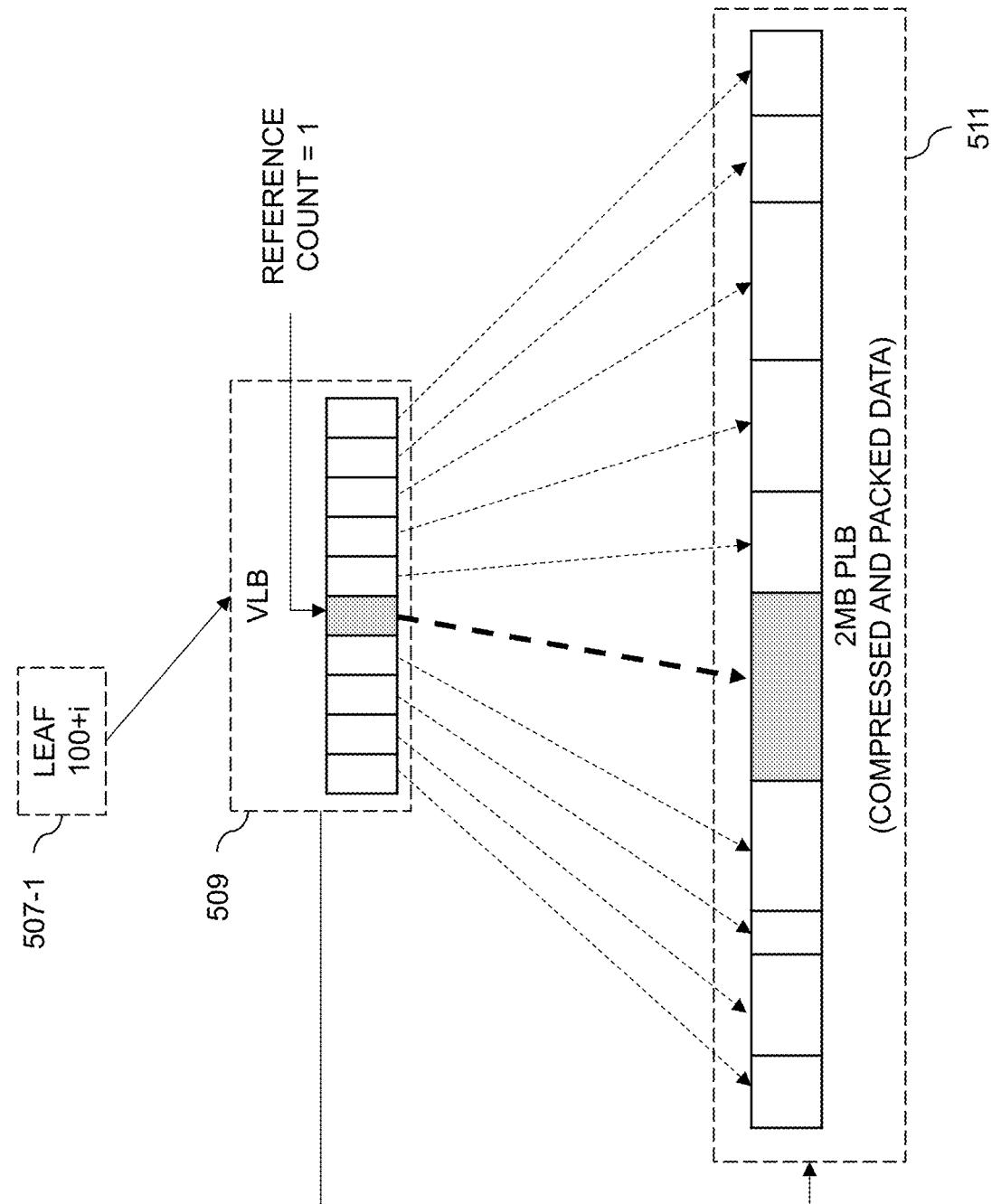

RECONSTRUCTION OF LOGICAL PAGES IN A STORAGE SYSTEM

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operation requests for delivery to the storage systems. Storage controllers of the storage systems service such requests for IO operations. Some storage systems use a logical address space, where logical page addresses in the logical address space map to physical page addresses on storage devices of the storage systems. The use of a logical address space facilitates various functionality, including implementation of deduplication in order to ensure that the same data is not repeatedly stored in a duplicative manner that consumes excessive storage capacity.

SUMMARY

In one embodiment, an apparatus comprises at least one processing device comprising a processor coupled to a memory. The at least one processing device is configured to obtain a first logical page of a logical address space comprising a plurality of logical pages and to obtain a first namespace address corresponding to a second logical page of the logical address space from the first logical page. The at least one processing device is further configured to obtain the second logical page based at least in part on the first namespace address. The second logical page comprises a plurality of entries. The at least one processing device is further configured to identify a given entry of the plurality of entries of the second logical page based at least in part on index information contained in the first logical page and to determine that the given entry comprises data other than a second namespace address corresponding to the first logical page. The at least one processing device is further configured to add the second namespace address corresponding to the first logical page to the given entry based at least in part on the determination that the given entry comprises data other than the second namespace address.

These and other illustrative embodiments include, without limitation, methods, apparatus, networks, systems and processor-readable storage media.

BRIEF DESCRIPTION OF THE DRAWINGS

FIGS. 5A and 5B illustrate deduplication using a virtual large block of the tree structure of FIGS. 4A and 4B in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
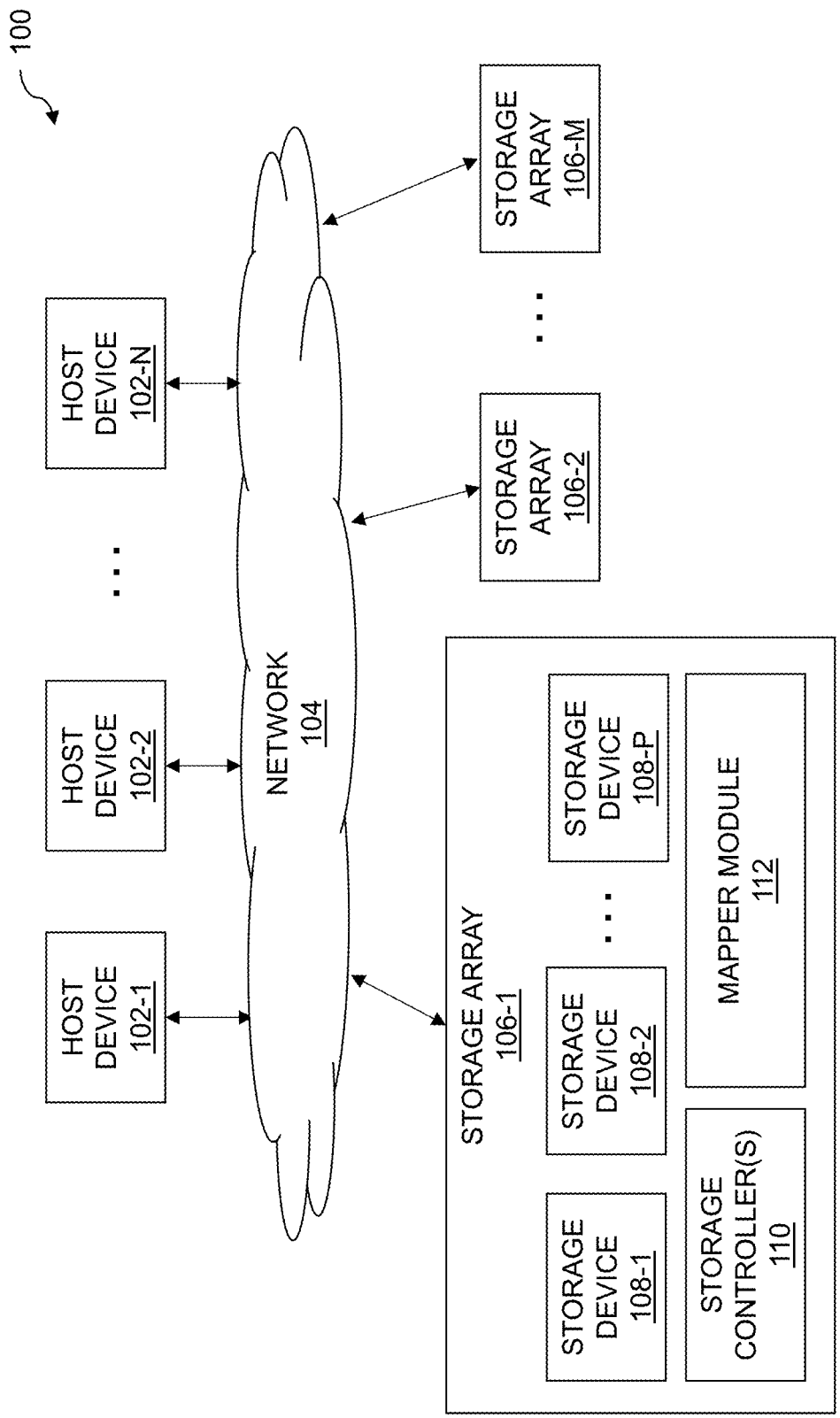
FIG. 1 is a block diagram of an information processing system including a storage array configured for reconstructing root pages in an illustrative embodiment.

FIG. 1 shows an information processing system 100 configured in accordance with an illustrative embodiment. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108-1, 108-2, . . . 108-P (collectively, storage devices 108) each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102 and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of the host devices 102 and the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

The storage array 106-1 in the present embodiment may comprise additional components not explicitly shown in the figure, such as a response time control module and IO operation priority queues, illustratively configured to make use of the above-described persistent memory. For example, the response time control module may be used to implement storage array-based adjustments in response time for particular IO operations based at least in part on service level objective (SLO) information stored by the storage array 106-1 in its persistent memory. The response time control module is assumed to operate in conjunction with the above-noted IO operation priority queues.

The storage array 106-1 illustratively utilizes its IO operation priority queues to provide different levels of performance for IO operations. For example, the IO operation priority queues may have respective different priority levels. The storage array 106-1 may be configured to provide different priority levels for different ones of the IO operations by assigning different ones of the IO operations to different ones of the IO operation priority queues. The IO operation priority queues are illustratively associated with respective SLOs for processing of IO operations in the storage array 106-1.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 106.

Numerous other distributed implementations of the host devices 102 and/or the storage arrays 106 are possible. Accordingly, the storage arrays 106 can also be implemented in a distributed manner across multiple data centers.

Additional examples of processing platforms utilized to implement portions of the system 100 in illustrative embodiments will be described in more detail below in conjunction with FIGS. 14 and 15.

The storage array 106-1 implements a mapper module 112. Although not explicitly shown in FIG. 1 for clarity of illustration, it is assumed in some embodiments that other ones of the storage arrays 106-2 through 106-M implement respective additional instances of a mapper module, as well as respective sets of storage devices and storage controllers in a manner similar to that described herein with respect to storage array 106-1. Further, although shown in FIG. 1 as being external to the storage controllers 110 of storage array 106-1, in other embodiments the mapper module 112 may be implemented at least partially within one or more of the storage controllers 110. For example, at least one of the storage controllers 110 may be implemented as a virtual storage controller running on an embedded hypervisor of the storage array 106-1. The mapper module 112 may be part of such a virtual storage controller, or may be run separate from the virtual storage controller on such an embedded hypervisor. Various other arrangements are possible, including where at least a portion of the functionality of the mapper module 112 is implemented external to the storage array 106-1 (e.g., on one or more of the host devices 102, on a separate server, on a cloud computing infrastructure, etc.).

The mapper module 112 is configured to maintain mappings between storage objects of the storage array 106-1 (e.g., more generally, storage objects of a storage system, which may include a storage cluster including the storage array 106-1 and one or more other ones of the storage arrays 106-2 through 106-M) which point to particular logical pages in a logical address space of the storage array 106-1. To do so, the mapper module 112 maintains a tree structure that characterizes relationships between a plurality of storage objects in the storage array 106-1. The tree structure is assumed to comprise a plurality of logical page nodes representing the plurality of storage objects. Each of the plurality of logical page nodes specifies a logical page address in the logical address space of the storage array 106-1, and includes various metadata such as an array of pointers to one or more other logical page addresses in the logical address space, a snapshot group identifier for a snapshot group in the storage array 106-1, a logical extent offset in the logical address space and, in some embodiments, an array of pointers to one or more child logical page addresses in the logical address space (also referred to as a child array) and a pointer to a parent logical page address in the logical address space along with an index into the parent logical page's child array.

The mapper module 112 is further configured to scan the logical pages of the storage array, for example, as part of a file system check tool, in response to a query by a host device, etc., and the scan may identify one or more logical pages that have corruption or have otherwise lost the links to associated logical pages. The mapper module 112 traverses the tree structure to scan the one or more logical pages and identify those pages that may be associated with corruption. For example, in the case where a root page is corrupted, the mapper module 112 may traverse other root pages along with their corresponding top pages and any horizontal parent-child relationships between those top pages and top pages that correspond to the corrupted root pages. The mapper module 112 may then reconstruct the corrupted root page based on the information found in the corresponding top pages. In this way, the mapper module 112 is able to rebuild corrupted root pages by taking advantage of the horizontal and vertical relationships between the logical pages.

At least portions of the functionality of the mapper module 112 may be implemented at least in part in the form of software that is stored in memory and executed by a processor.

It is to be understood that the particular set of elements shown in FIG. 1 for reconstructing root pages is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
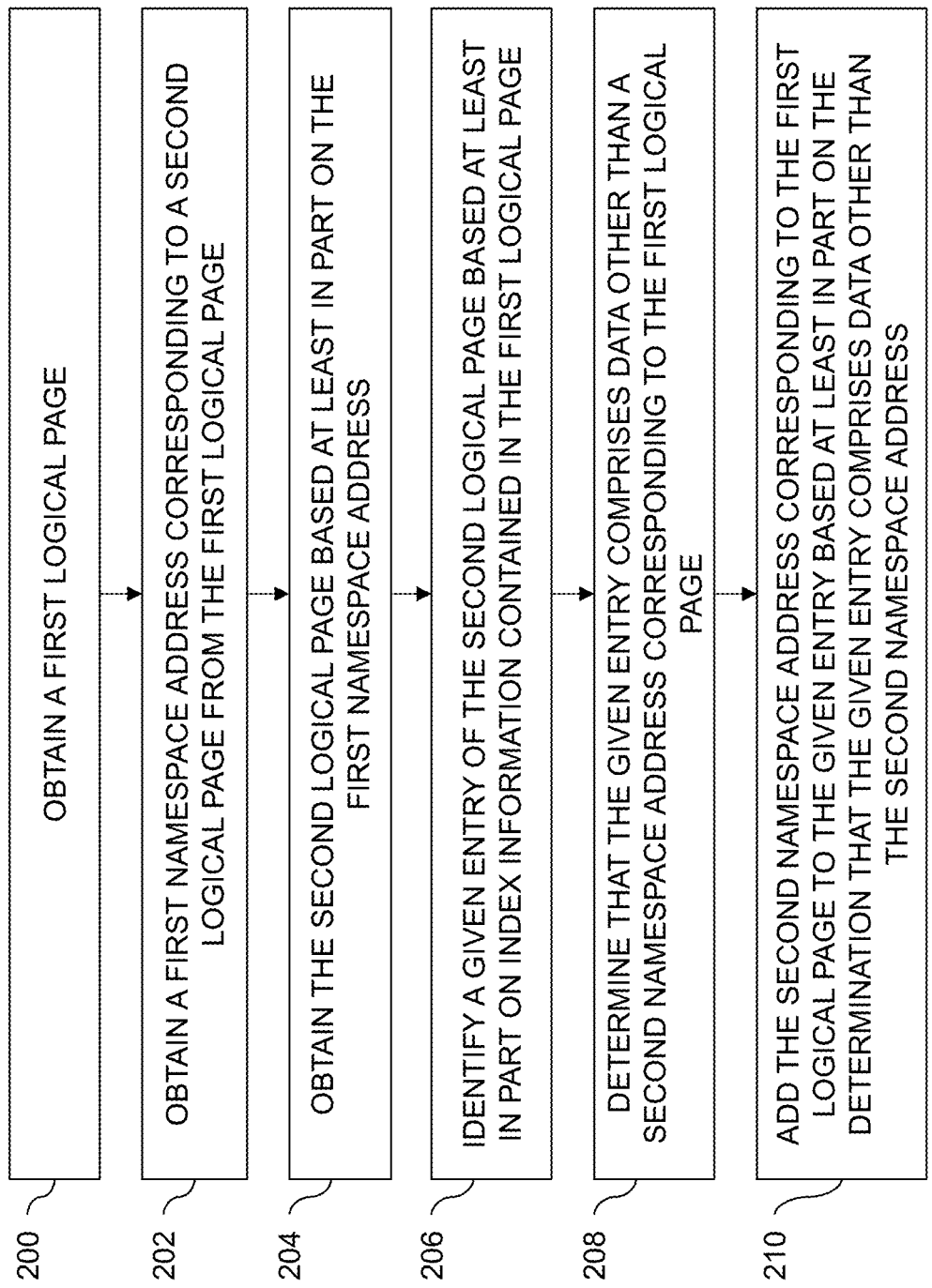
FIG. 2 is a flow diagram of an exemplary process for reconstructing root pages in an illustrative embodiment.

An exemplary process for reconstructing root pages will now be described in more detail with reference to the flow diagram of FIG. 2. It is to be understood that this particular process is only an example, and that additional or alternative processes for reconstructing root pages may be used in other embodiments.

In this embodiment, the process includes steps 200 through 210. These steps are assumed to be performed by the storage array 106-1 utilizing the mapping module 112. The process begins with step 200, obtaining a first logical page. The first logical page in an illustrative embodiment comprises a top page of a logical address space.

In some embodiments, the logical address space is organized as a B-tree (an example of which will be described in further detail below with respect to FIGS. 4A and 4B), where the B-tree includes multiple levels including a root logical page level, a top logical page level below the root logical page level, a mid logical page level below the top logical page level and a leaf logical page level below the mid logical page level. The tree structure may comprise a hash of binary trees that arrange the plurality of logical page nodes into the various logical page levels. A given one of the top pages may represent an n*m sized portion of the logical address space that references n middle pages in the middle page level each representing an m sized portion of the logical address space, a given one of the middle pages referencing n leaf pages in the leaf page level each representing an m/n sized portion of the logical address space. In some embodiments, n is 512 and m is one gigabyte (GB).

In step 202, the mapper module 112 obtains a first namespace address that corresponds to a second logical page from the first logical page. For example, step 202 may include obtaining the first namespace address from a back pointer of the first logical page that references the corresponding root page, e.g., the second logical page.

In step 204, the mapper module 112 obtains the second logical page based at least in part on the first namespace address.

In step 206, the mapper module 112 identifies a given entry of the second logical page based at least in part on index information contained in the first logical page. For example, the mapper module 112 may obtain the index information from the back pointer of the first logical page such as, e.g., an index into an array of pointers of the second logical page at which a second namespace address corresponding to the first logical page should be stored.

In step 208, the mapper module 112 determines that the given entry comprises data other than a second namespace address corresponding to the first logical page. For example, the given entry may comprise an empty set such as, e.g., all 0s or another value considered by the storage system to be empty. For example, if the mapper module 112 determined that the second logical page, e.g., the root page, was corrupted, the mapper module 112 may format the corrupted page, e.g., to all 0s or another value or pattern of values. In another example, the given entry may comprise a third namespace address that is different than the second namespace address, e.g., may point to another top page.

In step 210, the mapper module 112 adds the second namespace address corresponding to the first logical page to the given entry based at least in part on the determination that the given entry comprises data other than the second namespace address. For example, if the given entry is empty, the second namespace address may be added to the given entry by the mapper module 112. In another example, if the given entry comprises a third namespace address, the mapper module 112 may replace the third namespace address with the second namespace address. In some embodiments, a third logical page that corresponds to the third namespace address may be obtained and compared to the first logical page to determine which logical page is more recent and the more recent logical page may be added or maintained in the given entry. For example, if the first logical page is more recent than the third logical page, the third namespace address that corresponds to the third logical page may be replaced with the second namespace address that corresponds to the first logical page. In another example, if the third logical page is more recent than the first logical page, the mapper module 112 may instead maintain the third namespace address in the given entry and not add the second namespace address at all. In such a case, the first logical page may be transferred to a free block data structure which comprises pages awaiting re-allocation by the storage system. The functionality of the mapper module 112 will be described in more detail below with reference to FIGS. 3-13.

Figure 3:
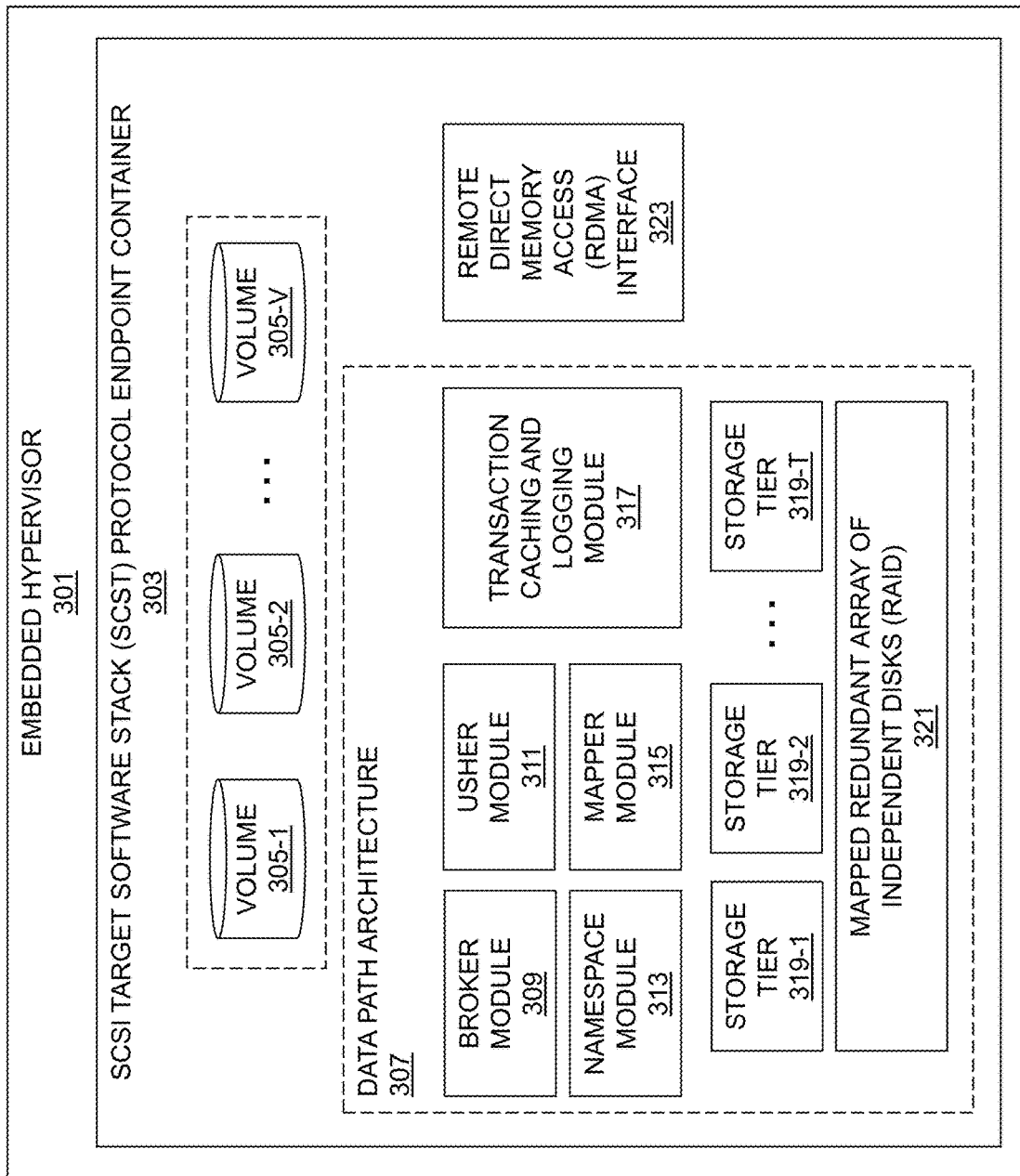
FIG. 3 is a block diagram of an embedded hypervisor implementing a data path architecture in an illustrative embodiment.

FIG. 3 shows a view of a data path architecture 307 for an I/O stack of a storage array (e.g., storage array 106-1). The data path architecture 307 is assumed to be implemented on an embedded hypervisor 301 (e.g., a VMware ESXi™ hypervisor) that runs a base container 303 providing an SCSI target software stack (SCST) protocol endpoint. The embedded hypervisor 301 is an example of a "virtual" storage controller of a storage system (e.g., a virtual one of the storage controllers 110 in storage array 106-1). The SCST protocol endpoint container 303 includes a set of volumes 305-1, 305-2, . . . 305-V (collectively, volumes 305) and the data path architecture 307. The data path architecture 307 includes a broker module 309, usher module 311, namespace module 313, mapper module 315, and a transaction caching and logging module 317. The data path architecture 307 also includes a set of storage tiers 319-1, 319-2, . . . 319-T (collectively, storage tiers 319) and a mapped redundant array of independent disks (RAID) 321. The transaction caching and logging module 317 is configured to utilize remote direct memory access (RDMA) interface 323 as described in further detail below.

The broker module 309 is configured to facilitate communication amongst the various other modules of the data path architecture 307. In some embodiments, the data path architecture 307 implements a layered services model (e.g., for copy engines, replication, migration, etc.). The usher module 311 is configured to implement I/O request queues, including priority share-based scheduling and Quality of Service (QoS) for I/O requests in such queues. The namespace module 313 is configured to implement active/active "thin" volumes and maintain volume attributes. The namespace module 313 is also configured to implement a key-value (K-V) store and directories. The mapper module 315 is configured to implement a thin mapping layer using log-structured writes, with inline compression, deduplication and pattern matching functionality. The mapper module 315 is also configured to implement functionality for snapshotting and determining snapshot differentials, for performing space accounting, and for file system checking (e.g., using a tool such as a Linux file system consistency check (FSCK) tool). In illustrative embodiments, the mapper module 315 implements the functionality described above for mapper module 112. The transaction caching and logging module 317 is configured to implement transactions for the active/active volumes, to perform distributed locking, and to implement read/write-back and write-ahead logs. The transaction caching and logging module 317 may comprise two instances, one for data and one for metadata. The mapped RAID 321 is configured to implement distributed virtual striping (e.g., using 4+1 and 8+1 RAIDS implementations) and to provide thin rebuild and distributed sparing. The mapped RAID 321 may support various native block sizes (e.g., 512 bytes (B), 4096B or 4 kilobytes (KB), etc.).

In some embodiments, the usher module 311 implements a data plane polling model. From the producer side (e.g., of the SCST protocol endpoint), requests are submitted using per-core threads. Polling threads pull new I/O requests to user space. The polling threads may execute when associated data plane threads are idle. Load balancing, affinity and QoS (e.g., share-based scheduling and traffic shaping) features may be provided.

The namespace module 313, as described above, is configured to create and expose thin block volumes, and provides functionality for volume management and attributes as well as space management and accounting. The namespace module 313 enables or provides a namespace layer that utilizes a block interface with file-like semantics. In the namespace layer, volumes (e.g., volumes 305) are bound to block protocol endpoints (e.g., PE LUNs). The mapper module 315 enables or provides a mapping layer, which exposes a single contiguous thin address space to the namespace layer. The namespace layer consumes the logical address space provided by the mapper layer.

The namespace layer may use a format that includes a "super block" created by an internal format and anchored at a logical block address (LBA) of 0. The super block identifies locations of allocations, an inode table, and a "root" directory. The allocations provide references to extent allocators, used to manage free space, as well as to inodes. The extent allocators may use a binary buddy system, and enable efficient reclaiming and defragmenting functionality. In some embodiments, the minimum allocation size is 8 MB, and the minimum allocation size for virtual volumes (VVols) such as volumes 305 is 2 GB. The volume allocation aligns to the "mid" level of the mapper as described in further detail below.

The inode allocators provide references to an inode table, which in some embodiments is scalable to millions of inodes and is organized as a free list. An inode may include various content, such as an object type (e.g., file, directory), family universally unique identifier (UUID), inode number and generation, link count, unique identifier (UID) owner, global identifier (GID) owner, object extent location, create and other timestamps, parent inode number, parent directory cookie, etc. The root inode references a root directory object that contains a list of file names and inodes, while additional inodes contain volume data (e.g., by allocating a data extent and inode, and adding the volume name and inode to the root directory). Multiple volume data extents may be created. Object handles may be used by the usher module 311 to submit I/O through handles (e.g., inodes) to avoid unnecessary name lookup.

The transaction caching and logging module 317 may implement a transaction cache and a transaction log. The transaction cache, in some embodiments, is transactional and provides read and write cache buffering with two instances (e.g., data and metadata). The transaction cache pages data and metadata in and out of memory, and provides local and distributed peer-to-peer (P2P) sticky locks. In some embodiments, an active/active configuration, an ALUA configuration, or combination thereof may be used. For example, the data path architecture 307 may be active/active, while SCST supports both active/active and ALUA. The transaction log provides write-ahead transaction logs, such as by using low latency mirrored NVRAMs for persistence. The transaction cache, for example, may be implemented in-memory (e.g., DRAM), while the transaction log is persisted to NVRAM.

The mapper module 315, as noted above, may provide a mapping layer of the data path architecture 307. The mapping layer may provide various functionality, such as enabling patterns, deduplication, compression, and mapping. Pattern functionality includes storing patterns (e.g., rather than pointer+data), and re-generating data on read, and may include 4 KB of 0s or 1s (where, in this context, 0s are different than unmapped space). Deduplication functionality includes the use of a fingerprint cache and read and compare validation. Compression functionality may include the use of various types of compression algorithms, including QAT hardware offload, LZ Deflate, Dynamic Huffman, etc. In some embodiments, data is compressed and packed into 2 MB data stripes. The mapping functionality includes a thin map, implemented in some embodiments as a 512-way B-tree structure described in further detail below. The thin map in such embodiments is keyed by LBA (e.g., rather than using content-addressable storage (CAS)), and provides snapshot and differential capability along with copy-by-reference. The mapper module 315 may utilize the storage tiers 319 (e.g., using flash tiers, storage-class memory (SCM) tiers, NVRAM tiers, etc.).

Figure 4A:
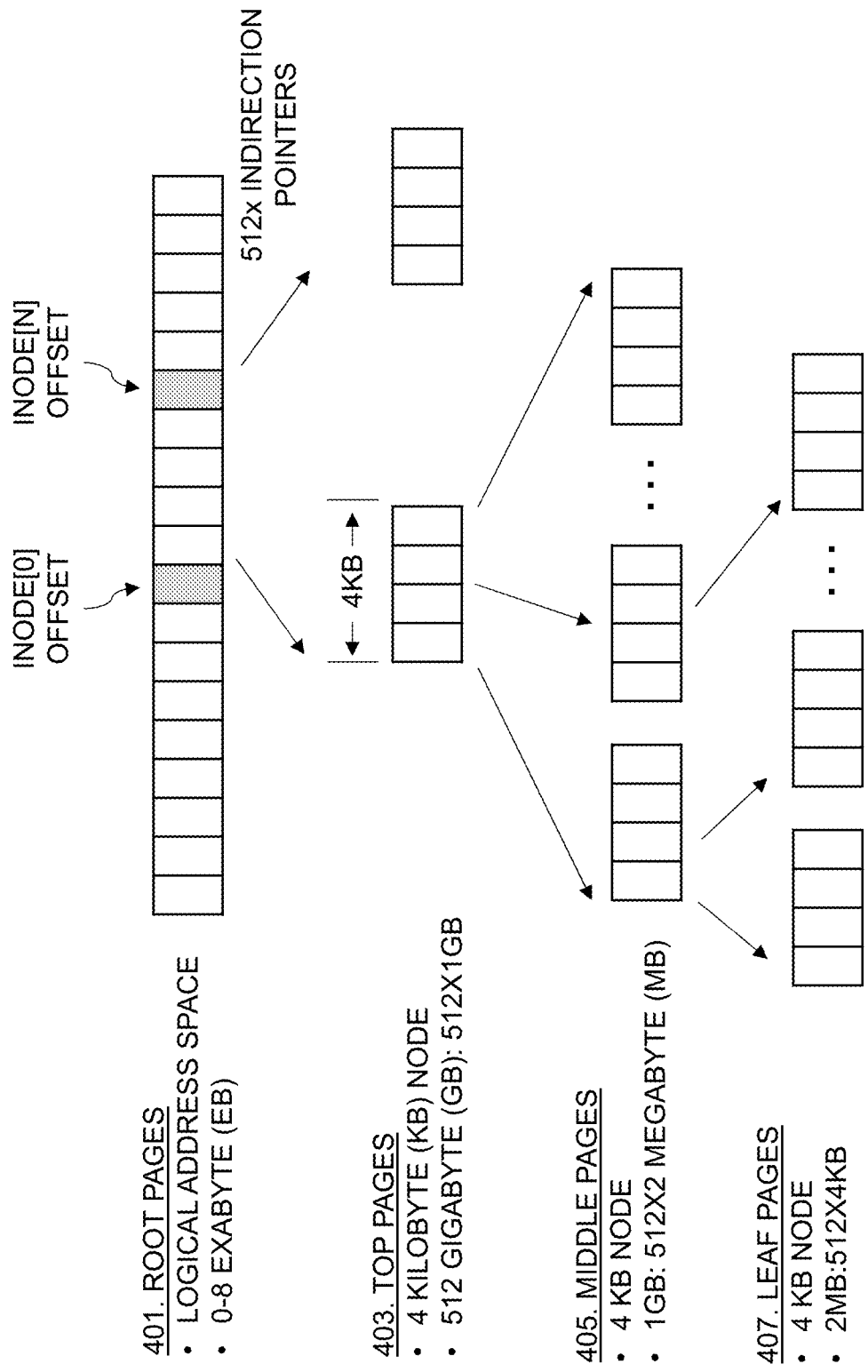
FIGS. 4A and 4B illustrate a tree structure for a logical address space in an illustrative embodiment.
Figure 4B:
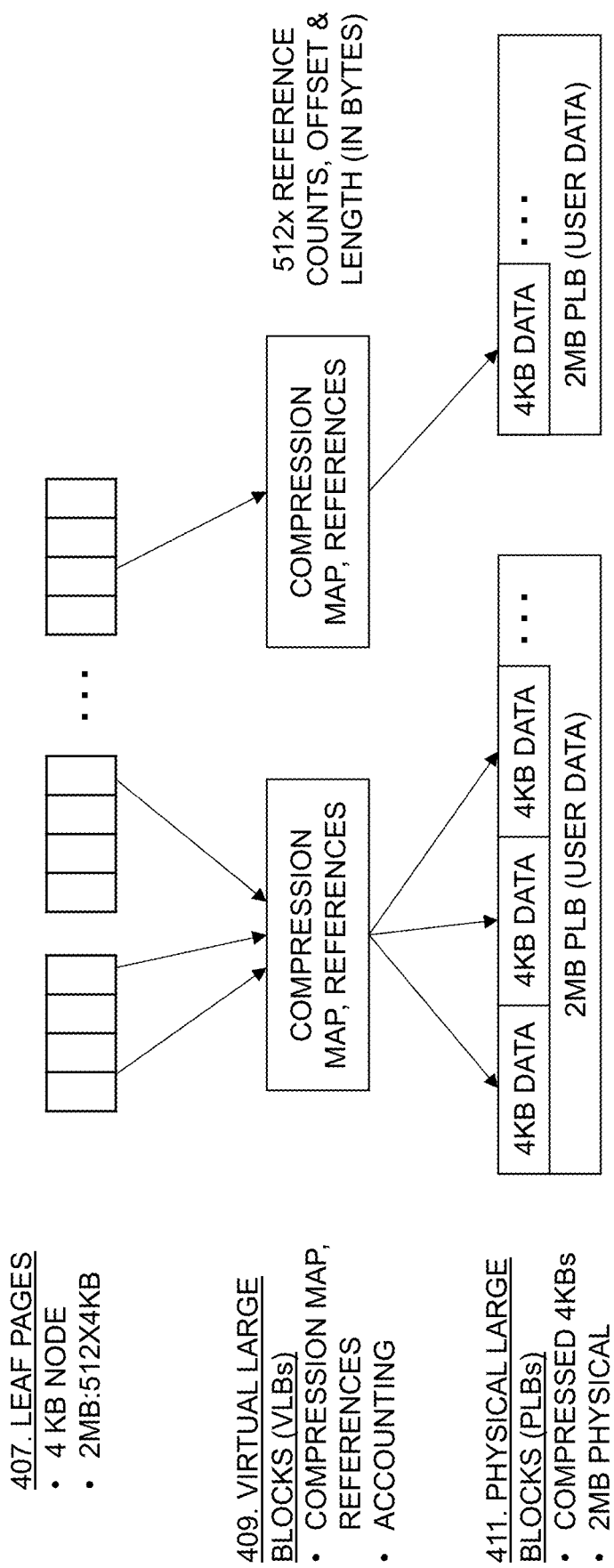

FIGS. 4A and 4B show a tree structure utilized by the mapper module 315 to store data in some embodiments. As noted above, the tree structure may comprise a 512-way B-tree structure, with levels for root pages 401, top pages 403, middle ("mid") pages 405, leaf pages 407, virtual large blocks (VLBs) 409, and physical large blocks (PLBs) 411. As illustrated in FIG. 4A, the root pages 401 provide a logical address space, which in some embodiments ranges from 0 to 8 exabytes (EB). The logical address space, which may be a thin logical address space, includes various inode offsets, two of which are labeled (e.g., inode[0] and inode[1]). Each of the inode offsets for the root pages 401 include a 4 KB node with 512 indirection pointers to respective ones of the top pages 403, each of the top pages 403 also has a 4 KB node with 512 pointers to respective ones of the middle pages 405, and each of the middle pages 405 has a 4 KB node with 512 pointers to respective ones of the leaf pages 407. Each of the leaf pages 407 may represent 2 megabytes (MB), and thus a given one of the middle pages 405 may represent 1 gigabyte (GB) (e.g., 512 of the leaf pages 407×2 MB) and a given one of the top pages 403 may thus represent 512 GB (e.g., 512 of the middle pages 405×1 GB).

As illustrated in FIG. 4B, each of the leaf nodes 407 may include 512 pointers to VLBs 409 each representing 4 KB (e.g., such that a given one of the leaf nodes 407 represents 2 MB as noted above, as 512×4 KB=2 MB). The VLBs 409 include reference counts, compression maps, and accounting information (e.g., offset and length, in bytes (B)) for the PLBs 411. Each of the PLBs 411 provides 2 MB physical space for storing user data (e.g., as a set of 4 KB compressed data blocks).

The mapper module 315 may access the tree structure of FIGS. 4A and 4B using keys, where a key for the root pages 401 level includes a host LBA and inode offset and index, where the index is the key divided by 256 terabytes (TB). At the top pages 403 level, the index is the key modulo 512 GB. At the middle pages 405 level, the index is the key modulo 1 GB. At the leaf pages 407 level, the index is the key modulo 2 MB.

Figure 5B:
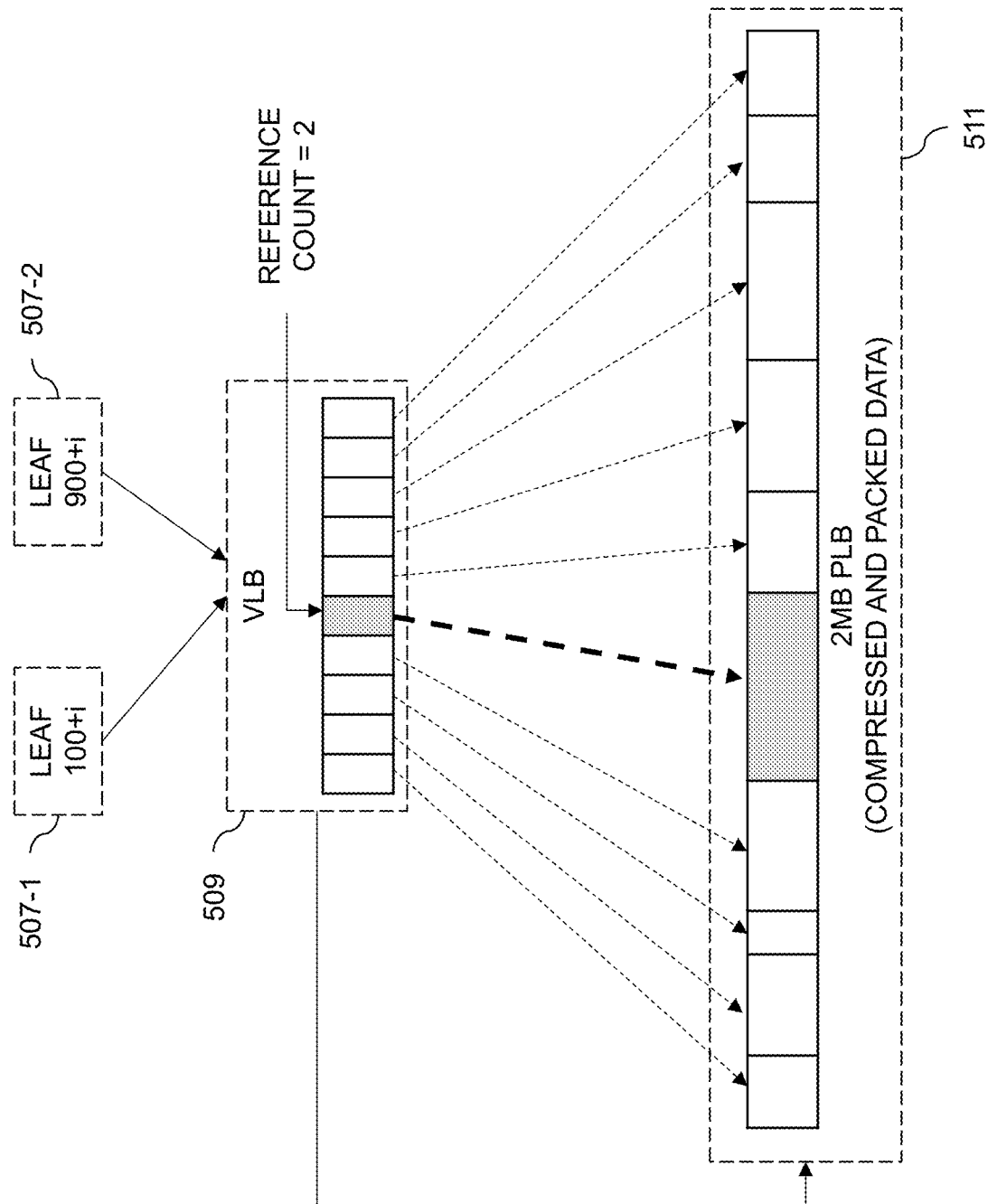

FIGS. 5A and 5B show deduplication using VLBs of the tree structure of FIGS. 4A and 4B. FIGS. 5A and 5B show a given VLB 509 and associated PLB 511 which includes 2 MB of compressed and packed data. The VLB 509 is assumed to contain a block address of the PLB 511, which provides a 2 MB data extent, and an array with 512 virtual entries. The virtual entries of a VLB, such as the 512 entries of VLB 509 in the example of FIGS. 5A and 5B, may be associated with respective virtual block addresses. Each VLB may thus be associated with a VLB extent that comprises a range of virtual block addresses (a VLB extent, in some cases, may include multiple VLBs such that its associated range of virtual block addresses span the multiple VLBs).

Each of the 512 virtual entries of the VLB 509 includes a byte offset to where a compressed 4 KB data portion starts in the PLB 511, as well as a byte length of the compressed 4 KB data portion and a reference count (e.g., the number of leaf page references to that compressed 4 KB data portion). In FIG. 5A, one leaf page 507-1 (e.g. leaf 100+i) references a particular compressed 4 KB data portion (e.g., shaded in gray) in the PLB 511. Thus, as shown in FIG. 5A, the reference count in the VLB corresponding to that portion (e.g., also shaded in gray) is 1. FIG. 5B shows that, when another leaf page 507-2 (e.g., leaf 900+i) also references that particular portion in PLB 511, the reference count for that portion in VLB 509 is updated to 2. In this way, two or more leaf pages can reference the same virtual block address. In the example of FIGS. 5A and 5B, deduplication has a granularity of 4 KB (e.g., the size of each compressed data portion in the PLB 511). Some embodiments enable a global deduplication domain, where any of the leaf pages can reference any of the compressed data portions in any of the PLBs. The reference count, however, may limit deduplication to a certain amount (e.g., 256:1).

To implement deduplication, a deduplication "fingerprint" cache may be utilized. The fingerprint cache may be implemented as a large K-V store, with N-way associative hashes providing fast, in-memory lookup that enables verification of deduplication with read and compare. Consider a piece of data, denoted $data_1$, that is found in the fingerprint cache. This may include hashing $data_1$, where the hash matches a key in the K-V store corresponding to a given VLB. The given VLB is then fetched to find the page referenced, and the corresponding portion of the associated PLB is read, decompressed and then compared to verify that $data_1$ is a duplicate. Consider another piece of data, denoted $data_2$, that is not found in the fingerprint cache. In this case, a new entry is added to the K-V store (e.g., a new K-V pair). If there is no remaining space, entries may be evicted using any suitable cache replacement algorithm, such as a least recently used (LRU) cache replacement algorithm. The $data_2$ is then stored as a new 4 KB data block in one of the PLBs.

The mapper module 315 may implement log-structured writes for efficient full stripe RAID writes (e.g., where each stripe is 2 MB continuing the example above) to flash memory using mapped RAID 321. Pending writes are flushed from the transaction cache or transaction log cache implemented by transaction and log caching module 317. Patterns and duplications are subtracted, then the data is compressed and packed into a stripe. The full stripe is then written and mapped to the thin address space.

Figure 6A:
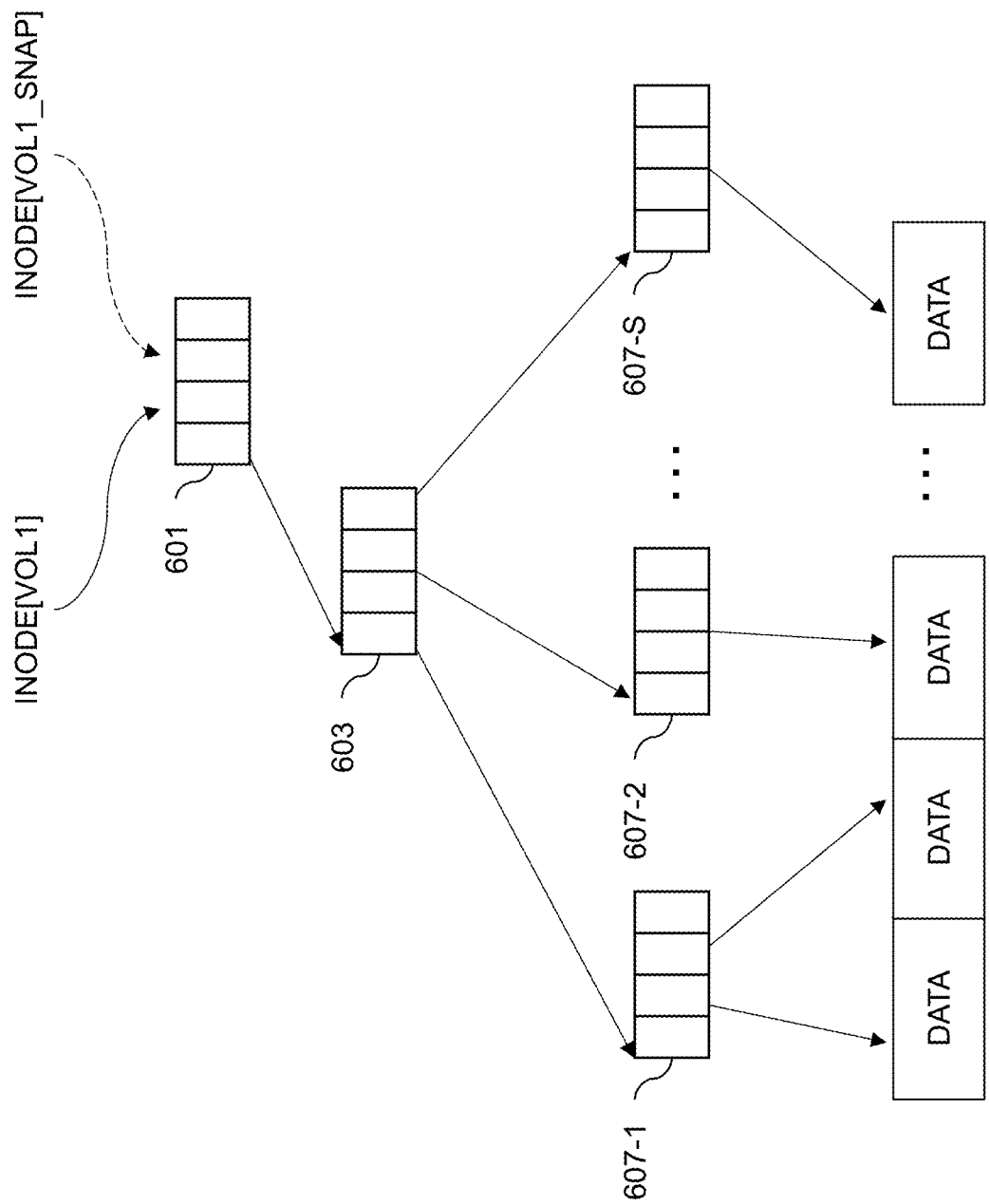
FIGS. 6A-6D illustrate snapshotting using the tree structure of FIGS. 4A and 4B in an illustrative embodiment.
Figure 6B:
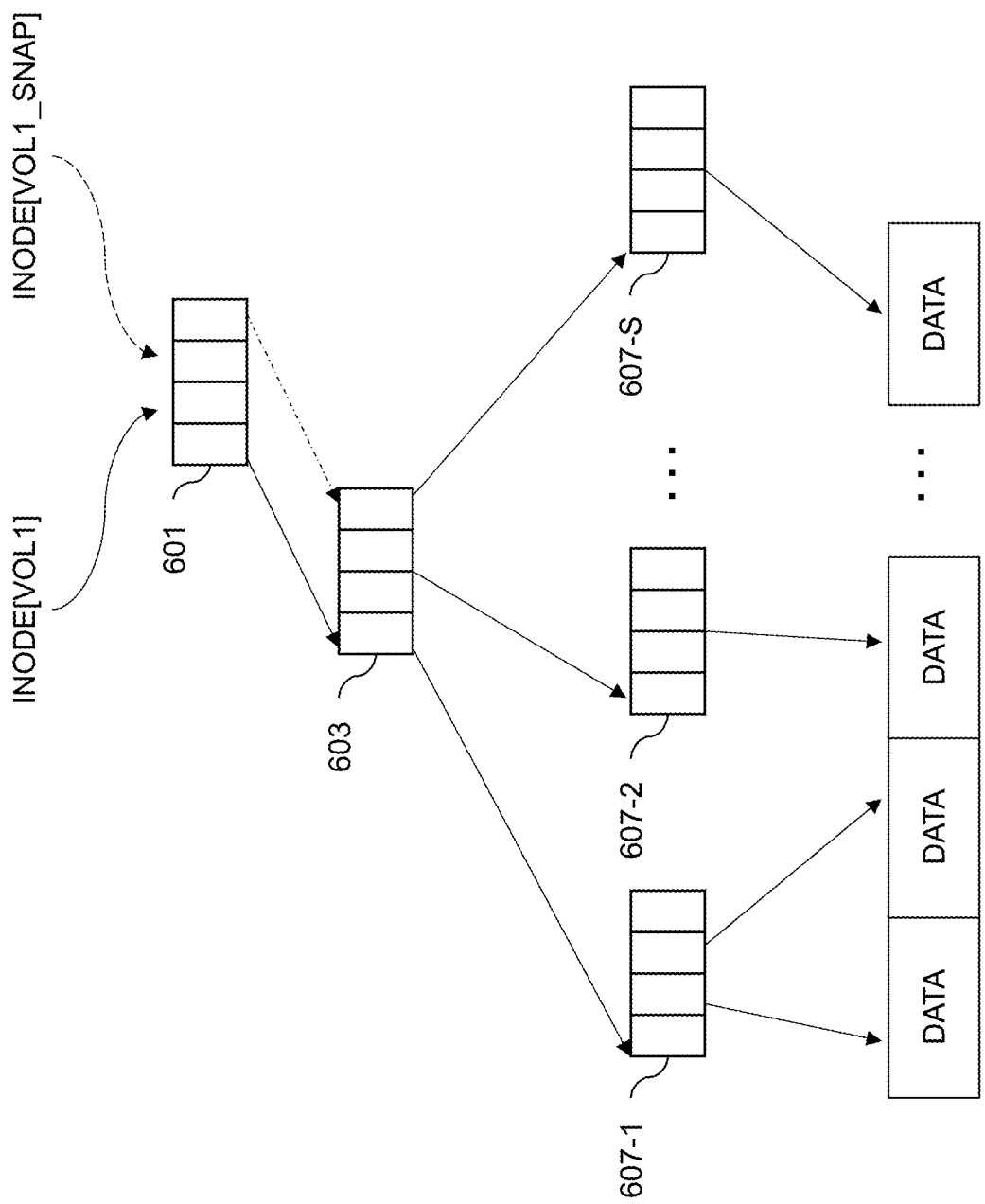
Figure 6C:
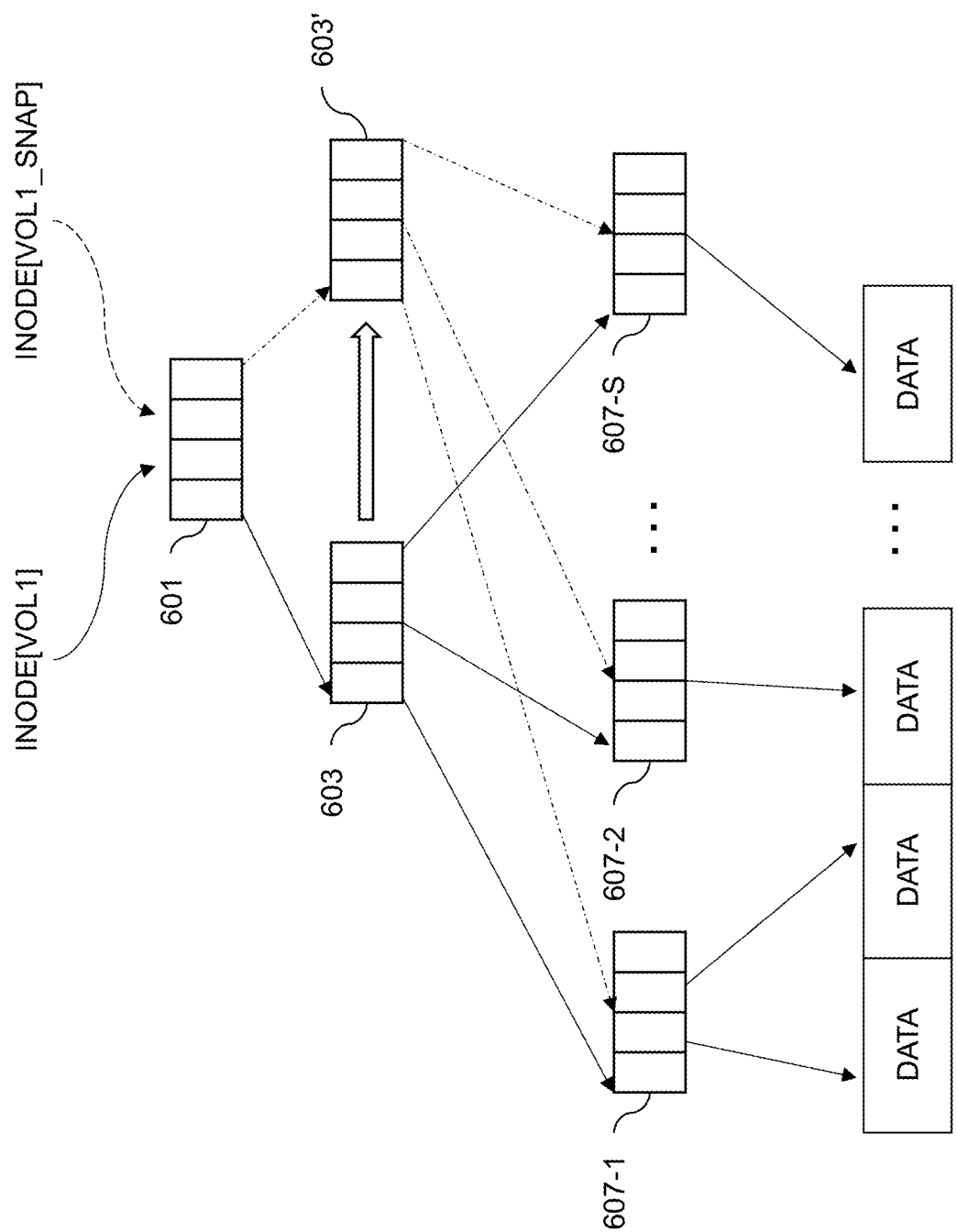
Figure 6D:
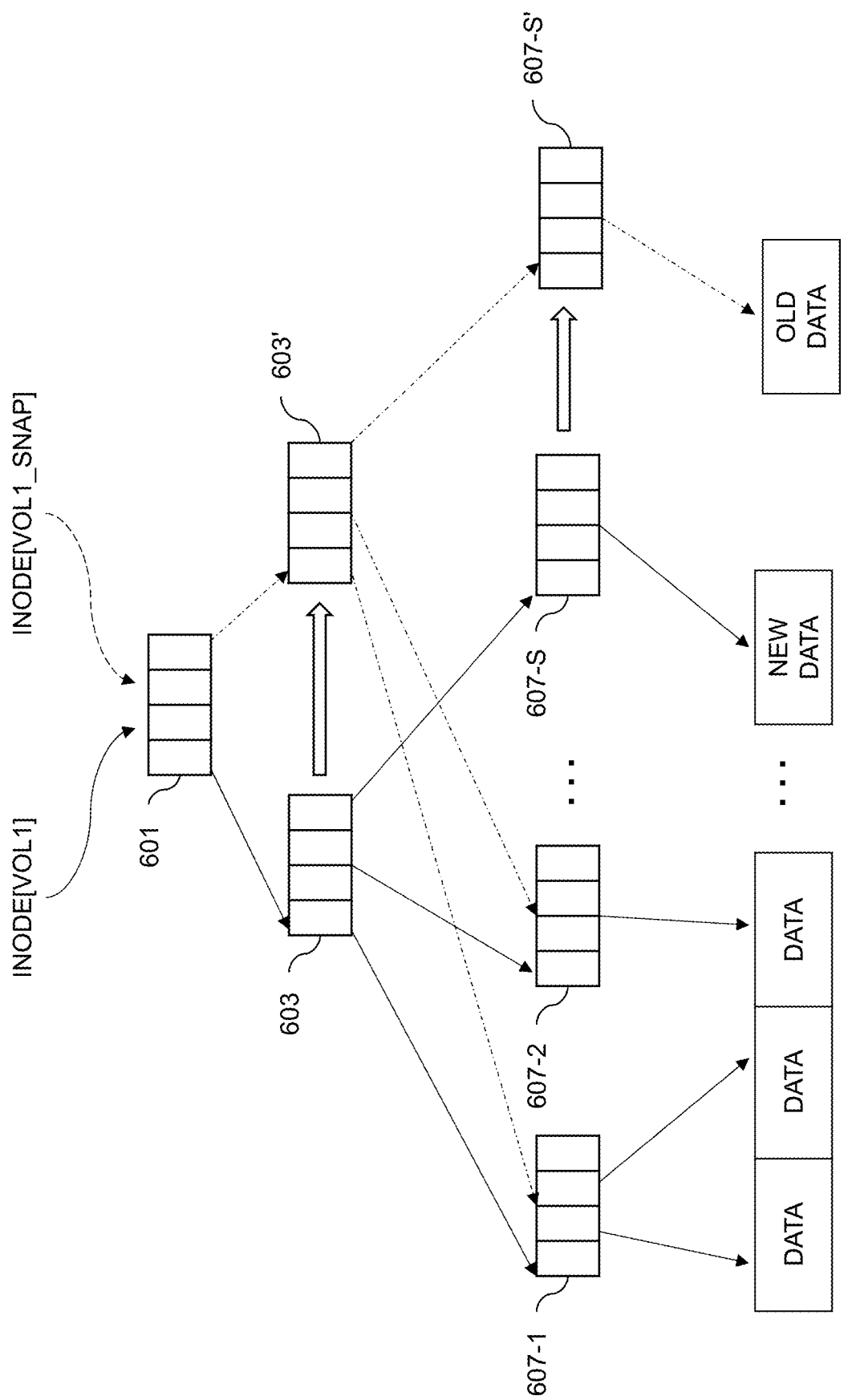

FIGS. 6A-6D illustrate snapshotting functionality enabled by the mapper module 315 using the B-tree structure described above with respect to FIGS. 4A and 4B. As shown in FIG. 6A, a particular inode for a volume (e.g., inode [vol1]) references a particular root page 601, which references a top page 603, which references a set of middle pages (not shown), which references a set of leaf pages 607-1, 607-2, . . . 607-S (collectively, leaf pages 607) which reference underlying data (e.g., through VLBs and PLBs not shown). When a snapshot of the volume is created, another inode is allocated (e.g., inode[vol1_snap]) that references the root page 601 and copy-by-reference is performed as shown in FIG. 6B. On a first write to the volume (e.g., to vol1), the nodes of the tree structure are split in a recursive manner. First, the top page 603 is copied to top page 603' as shown in FIG. 6C. Middle pages (not shown) are then copied, follow by copying one of the leaf pages 607 affected by the write. As shown in FIG. 6D, this includes copying leaf page 607-S to leaf page 607-S'. The new data to be written is stored in one or more VLBs and PLBs referenced by leaf page 607-S, while the old or existing data is stored in one or more VLBs and PLBs referenced by leaf page 607-S'.

The mapped RAID 321, as noted above, implements virtual striping (e.g., using 4+1 and 8+1 RAIDS), enabling thin rebuild, distributed sparing, and various native block sizes (e.g., 512B, 4096B, etc.). The RAID geometry may be selected based on the number of SSD disks (e.g., with 6-9 SSDs, 4+1 RAID may be used, with 10+ SSDs, 8+1 RAID may be used). It should be noted that embodiments are not limited to using SSD disks in a RAID. In other embodiments, other types of disks or storage devices may be used. The description below, however, assumes the use of SSDs for clarity of illustration. In some cases, the mapped RAID 321 may use resiliency sets, as reliability may drop as more SSDs are grouped together. To constrain the fault domain, resiliency sets may be split once a threshold number of SSDs is reached (e.g., with a 25 SSD maximum, the resiliency set is split on adding a $26^{th}$ SSD).

In some embodiments, the mapped RAID 321 includes a disk layout that has a minimum number of 6 SSD disks (e.g., flash SSDs or 3DXP SSDs). Serial attached SCSI (SAS) expansion may be used to expand the number and size of disks used. In some embodiments, particular slots or disks (e.g., 2 or 4 NVRAM SSDs) may be reserved for use as the transaction log cache implemented by transaction caching and logging module 317. A global configuration database (DB) may be stored using 1 MB on each drive in the mapped RAID 321, which includes a globally unique identifier (GUID) and drive state information. The mapped RAID 321 may include a RAID map DB that is 3-way mirrored across three of the disks, and includes information such as RAID type, width, etc. The mapped RAID 321 also utilizes metadata, data, and possibly other tiers. The mapper module 315 is configured to expand the tiers for more space, where expanding a tier includes forming a RAID geometry by allocating slices, adding to the RAID map, and returning to the mapper layer. A slice of the mapped RAID 321 may include 4 GB RAID allocation extents (NVRAM may use 128 MB), one or more "ubers" that each include N+1 slices grouped into a RAID set (e.g., 1+1, 4+1, 8+1, etc.), and one or more tiers each including a group of ubers.

In summary, the data path architecture 307, on receiving an I/O request from a host to store data, will write the data quickly and persistently to a cache (e.g., the transaction cache implemented by the transaction caching and logging module 317) and then send an acknowledgement to the host. The data path architecture 307 will then utilize the mapper module 315 identify and subtract patterns and duplicates in the data to form a flush set (e.g., a 2 MB flush set). The flush set is then compressed, packed and written to 2 MB stripes (e.g., in the mapped RAID 321).

In a log structured file system, such as that used in the data path architecture 307, mappings (e.g., as provided using the mapper module 315) provide critical information that links the user data to the physical location on the storage devices (e.g., SSDs). When file system checks (e.g., using a tool such as FSCK) are run, the consistency of the map is validated by cross-checking the linkages between the root pages 401, top pages 403, mid pages 405 and leaf pages 407. For example, when the file system check determines that one or more nodes of the map are corrupted, missing linkages, or otherwise in error, the linkages need to be rebuilt if possible.

In the logical address space of the mapper layer provided by mapper module 315 in the data path architecture 307, each logical page may be associated with various metadata, including an indirect data page (IDP) address (e.g., IDP 100, IDP 200, etc.). The IDP address is an example of what is more generally referred to as an indirect block address. Each logical page may also include an array of IDP addresses that the logical page points to. The logical page that is associated with a particular IDP address is also referred to as an IDP.

When performing recovery and other tasks, there may be a need to find the storage objects (e.g., volumes, snapshots, clones, etc.) that point to a particular logical page (e.g., a particular IDP page) in the mapper's logical address space. As described above, for example, it may be desired to find the mappings to a given corrupted IDP page. To do so, two relationships are used: vertical relationships and horizontal relationships. The vertical relationship is navigated by the offset of a given storage object. The horizontal relationship represents a parent-child relationship for a given snapshot family. Information associated with the vertical and horizontal relationships may be stored as a "back pointer" within each IDP page (e.g., top pages 403, mid pages 405 and leaf pages 407 in the logical tree structure of FIGS. 4A and 4B). The relevant information from the back pointer that is used to navigate the vertical and horizontal relationships, in some embodiments, include a namespace address (e.g., from a namespace layer of the data path architecture 307 implemented by namespace module 313), extent offset, and snapshot group identifier (ID).

A two-level data structure may be built-up during the initial browsing of the IDP pages (e.g., top pages 403, mid pages 405 and leaf pages 407) associated with each storage object. This two-level data structure maintains the relationships of the set of storage objects within a given snapshot (snap) group. In some embodiments, the two level-data structure may be viewed as a hash of binary trees, with there being a binary tree for each snap group. The first level of the two-level data structure is navigated based on the snap group IDs to find binary trees in the second level that characterize the relationships between storage objects for the snapshot groups associated with a selected snap group ID. Given a binary tree for a given snap group ID, it is possible to iterate over the storage objects in the snap group and then also to traverse the vertical relationships for each storage object using the namespace address stored in that storage object. An example of the two-level data structure is illustrated in FIG. 7.

A client (e.g., one of host devices 102, the file system check tool such as FSCK, etc.) that wants to search storage objects may provide the desired IDP page address, snap group ID, and extent offset. Given the snap group ID and extent offset from the back pointer of any IDP in the mapper address space, all the storage objects in the given snap group ID may be iterated over to check whether the desired IDP page address is found at the given extent offset. There are various use cases in which such reverse logical lookups are required. For example, such reverse logical lookups may be used to find the vertical and horizontal IDP pages for a given corrupted or orphaned IDP page. Being able to find the vertically and horizontally connected IDP pages provides the ability to potentially fix the corruption related to that IDP page. As another example, such reverse logical lookups may be used to report a corruption that cannot be repaired and results in data loss for all corresponding storage objects that map to the corrupted metadata object (e.g., an IDP page, a VLB object, etc.).

Figure 7:
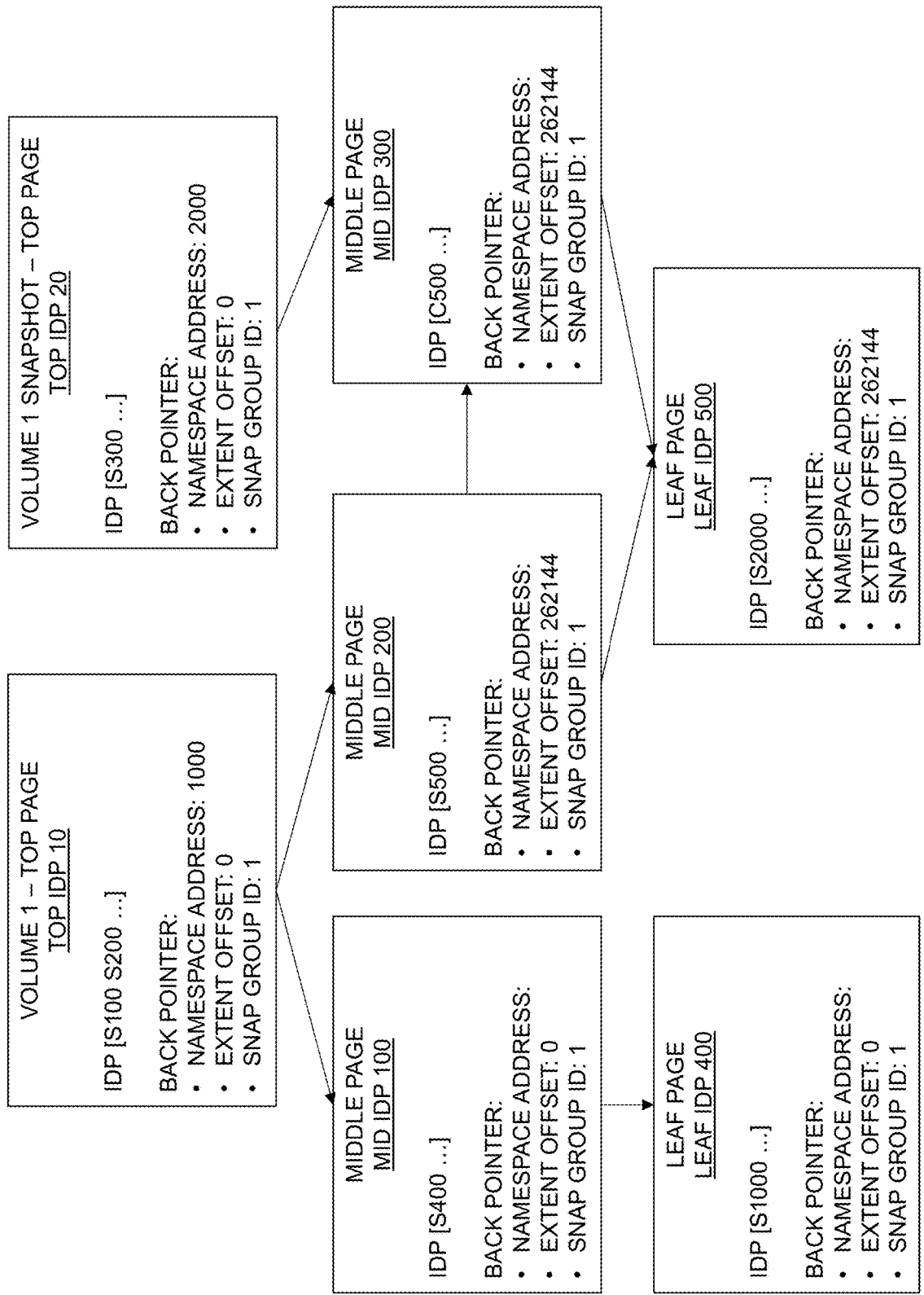
FIG. 7 shows a portion of a logical tree mapping for a reverse logical lookup of a given logical page address in an illustrative embodiment.

In FIG. 7, each of the IDP pages (e.g., top IDP pages 10 and 20, mid IDP pages 100, 200 and 300, and leaf IDP pages 400 and 500) includes an array of IDP addresses. For example, top IDP 10 includes IDP addresses of S100, S200, etc. The "S" in such addresses denotes source, while the "C" in addresses for other ones of the IDP pages in FIG. 7 denotes copy (e.g., "C500" in mid IDP page 300). Each of the IDP pages shown in FIG. 7 also includes a back pointer as described above, with a namespace address, extent offset and snap group ID.

Figure 8:
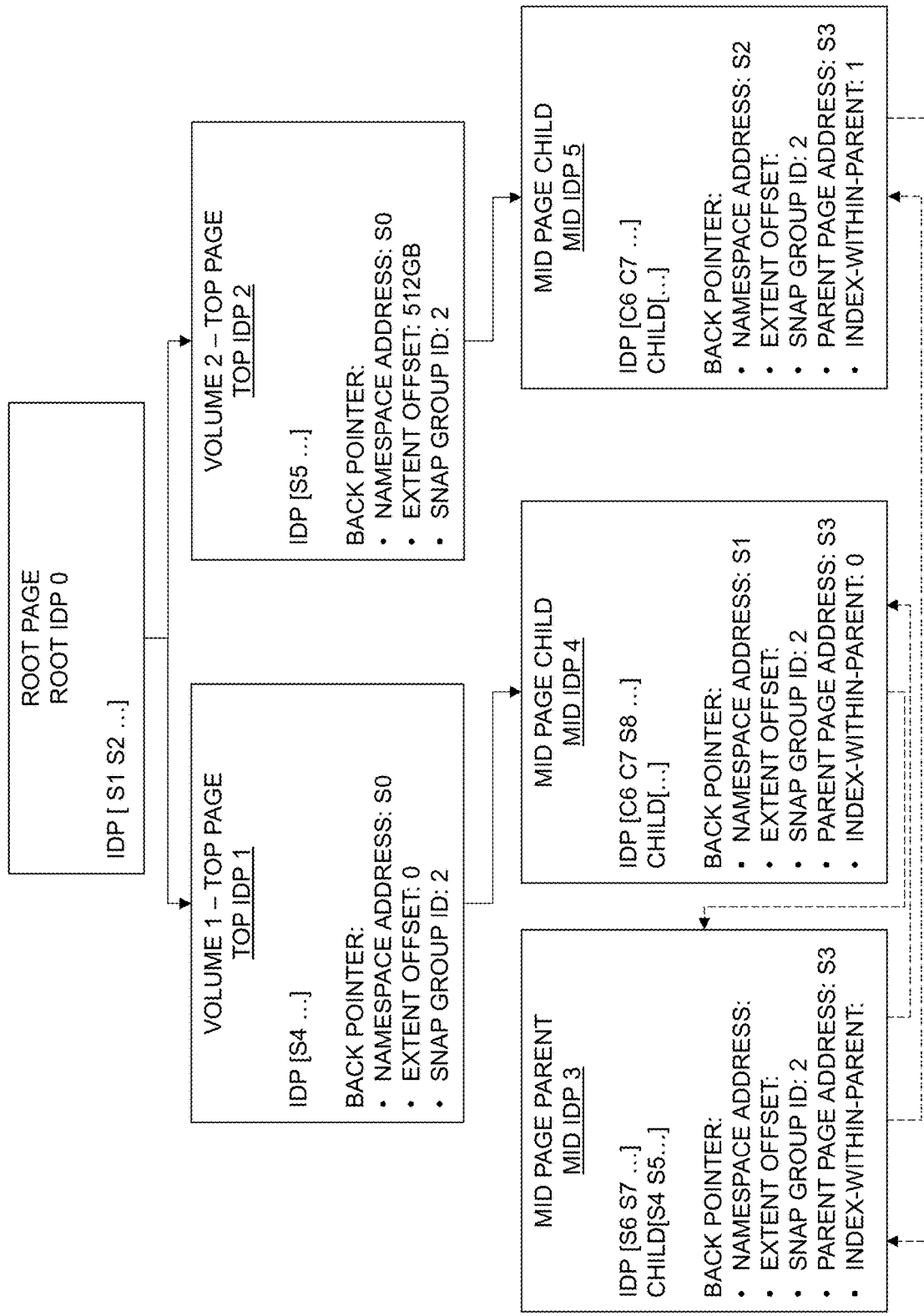
FIG. 8 shows a portion of the tree structure of FIGS. 4A and 4B in an illustrative embodiment.

With reference to FIG. 8, an example portion of the B-tree structure comprising a root IDP page 0, top IDP pages 1 and 2, and mid IDP pages 3, 4 and 5 is illustrated. As can be seen in FIG. 8, a root IDP page 0 comprises an array of IDP pointers, S1, S2, . . . , which point to corresponding top pages, e.g., top IDP pages 1 and 2. As an example, each IDP pointer S1 and S2 may comprise a namespace address at which the corresponding top IDP page 1 and 2 is located.

Top IDP page 1 comprises an array of IDP pointers, S4 . . . , which point to corresponding mid IDP pages, e.g., mid IDP page 4. Top IDP page 2 comprises an array of IDP pointers, S5 . . . , which point to corresponding mid IDP pages, e.g., mid IDP page 5. As an example, each IDP pointer S4 and S5 may comprise a namespace address at which the corresponding mid IDP page 4 and 5 is located.

Mid IDP page 3 comprises an array of IDP pointers, S6 S7 . . . , which point to corresponding leaf IDP pages, e.g., leaf IDP pages 6 and 7 (not shown).

Mid IDP page 4, which is a child of mid IDP page 3 that has been modified since being generated as part of a snapshot of mid IDP page 3, comprises an array of IDP pointers, C6 C7 S8 . . . , which point to corresponding leaf IDP pages, e.g., leaf IDP pages 6, 7 and 8 (not shown). It is important to note that IDP pointers C6 and C7 are copies of the IDP pointers S6 and S7 of mid IDP page 3 while IDP pointer S8 is a source IDP pointer that is not found in mid IDP page 3.

Mid IDP page 5, which is a child of mid IDP page 3 that has not been modified since being generated as part of a snapshot of mid IDP page 3, comprises an array of IDP pointers, C6 C7 . . . , which point to corresponding leaf IDP pages, e.g., leaf IDP pages 6 and 7 (not shown). Since mid IDP page 5 has not been modified, no source IDP pointers are present.

Each of the top IDP pages 403, mid IDP pages 405 and leaf IDP pages 407 also comprise a back pointer. The back pointer comprises information or metadata about relationships between associated IDP pages in the B-tree structure. For example, back pointer found in top IDP 1 may comprise a namespace address S0 corresponding to root IDP page 0. For example, the namespace address S0 found in top IDP 1 comprises the namespace address where the root IDP page 0 is located in the logical address space and may be utilized by mapper module 315 to identify the root IDP 0 based on the top IDP 1. The other IDP pages comprise similar namespace addresses that identify a vertical relationship with an IDP page at a higher IDP page level. The back pointers also comprise an extent offset and a snap group identifier similar to that described above for FIG. 7.

In illustrative embodiments, the back pointer may also comprise additional information about a parent-child relationship between IDP pages of the same IDP page level. For example, as shown in FIG. 8, the back pointer of mid IDP page 4 comprises additional information including a parent page address, e.g., S3, and an index-within-parent, e.g., 0. The parent page address allows the mapper module 315 to traverse the B-tree structure horizontally from a child to a parent to validate the relationship. For example, mid IDP page 4 is a child of mid IDP page 3. Mid IDP page 4 comprises a parent page address, S3, which is a pointer to mid IDP page 3, e.g., the namespace address at which the mid IDP page 3 is located.

The index-within-parent comprises an indication of which index into a child array of an IDP page a pointer to a child resides. For example, mid IDP page 3 comprises a child array, S4 S5 . . . , which comprises a pointer to mid IDP page 4 at index 0 and a pointer to mid IDP page 5 at index 1. The child array allows the mapper module 315 to traverse the B-tree horizontally from parent to child while the index-within-parent allows the mapper module 315 to verify and validate the parent-child relationship. For example, if the IDP pointer at a particular index does not match the child IDP page which has the index-within-parent for that index, the mapper module 315 may determine that there has been a corruption in the parent-child relationship. While described and illustrated with reference to mid IDP pages, the parent page address, index-within-parent and child arrays may be included in any other level of IDP pages including, for example, top IDP pages, leaf IDP pages, or in some cases even root IDP pages.

In some cases, the root pages 401 must be validated, checked for consistency, and rebuilt if possible. For example, the root pages 401 may be validated, checked for consistency and rebuilt as part of a file system check process. A given root page 401 may also be validated, checked for consistency and rebuilt based at least in part on a read request of the root page 401 returning an error such as, e.g., a media error where the returned data is corrupted or incorrect. A given root page 401 may also or alternatively be validated, checked for consistency and rebuilt for any other reason.

As part of the validation, the mapper module 315 attempts to read the given root page 401. If the given root page 401 cannot be read, the mapper module 315 formats the given root page 401, for example, such that it does not contain any pointers. As an example, the given root page 401 may be formatted to all zeros, all is or any other pattern that does not contain any pointers or references to any of the top pages 403 or that the mapper module 315 considers to be empty. The formatted root page 401 may also comprise the magic number at the specified location and have a valid checksum.

If the given root page 401 can be read, the mapper module 315 may generate a checksum for the root page 401 that is compared to an expected checksum value. If the generated checksum does not match the expected checksum value, the given root page 401 is formatted as described above.

If the given root page 401 can be read, the mapper module 315 may also or alternatively determine whether or not a magic value of the given root page 401 is present in a specified location in the given root page 401. For example, the magic value may comprise a specific value that is inserted into the root page 401 at a particular location. If the magic value is not found at that location when the mapper module 315 reads the given root page 401, the given root page 401 is formatted as described above.

In a case where the given root page 401 can be read and has not been formatted, e.g., the given root page has the magic number in the particular location, matches the checksum, etc., the mapper module 315 traverses the linkages of the given root page 401 to the corresponding top pages 403. For example, any non-zero/legal top page address and the corresponding block tree structure may be visited by the mapper module 315 for further validation and consistency checking.

Once a given top page 403 is reached from a root page 401, mapper module 315 performs validity and consistency checks in a similar manner to the root pages 401 as described above. If the given top page 403 is validated, a corresponding entry in a used-block data structure 900 (FIG. 9) is set.

Figure 9:
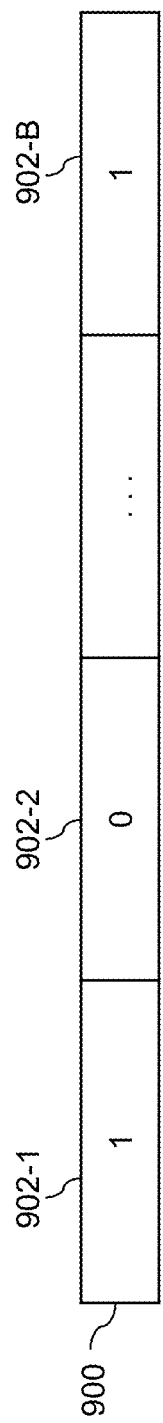
FIG. 9 shows an example used-block data structure in an illustrative embodiment.

With reference to FIG. 9, the used-block data structure 900 is generated during the validation process, for example, by the file system check tool of the mapper module 315, and comprises a plurality of entries 902-1, 902-2 . . . 902-B. In some embodiments, the used-block data structure 900 comprises a bitmap and each entry 902 comprise a corresponding bit of the bitmap. Each entry 902 corresponds to one of the pages of the block tree structure. For example, as the mapper module 315 walks through the root pages 401 and their corresponding top pages 403, mid pages 405 and leaf pages 407, the used-block data structure 900 is generated where each entry in the used-block data structure 900 corresponds to one of the root pages 401, top pages 403, mid pages 405, leaf pages 407, etc.

The mapper module 315 also verifies that the namespace address and extend offset in the back pointer for the given top page 403 matches the index in the root page 401 that was used to access the given top page 403. If the namespace address and extent offset found in the back pointer of the top page 403 matches the index in the root page 401, an entry corresponding to the top page 403 is set in a vertically-verified data structure 1000 (FIG. 10) to indicate that the top page 403 is vertically verified and found within the root page 401.

Figure 10:
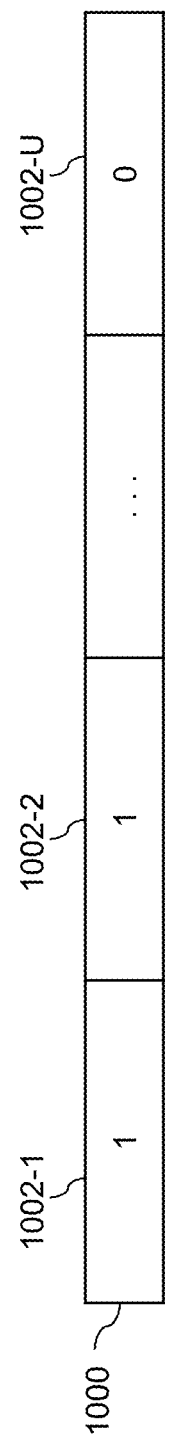
FIG. 10 shows an example vertically-verified data structure in an illustrative embodiment.

With reference to FIG. 10, the vertically-verified data structure 1000 is generated during the validation process in a similar manner to the used-block data structure 900, for example, by the file system check tool of the mapper module 315, and comprises a plurality of entries 1002-1, 1002-2 . . . 1002-U. In some embodiments, the vertically-verified data structure 1000 comprises a bitmap and each entry 1002 comprise a corresponding bit of the bitmap. Each entry 1002 corresponds to one of the pages of the block tree structure. For example, as the mapper module 315 walks through the top pages 403, mid pages 405 and leaf pages 407, the vertically-verified data structure 1000 is generated where each entry 1002 in the vertically-verified data structure 1000 corresponds to one of the top pages 403, mid pages 405, leaf pages 407, etc.

Once a top page 403 is validated, the mapper module 315 performs horizontal validation by traversing the horizontal parent-child relationships associated with the top page 403 to validate any related parent or child top pages 403, for example as described above with reference to FIGS. 7 and 8. For example, the mapper module 315 may utilize the snap group ID, parent page address, index-within-parent, child array of IDPs or other similar information found in an IDP page to identify the associated parent or child top pages 403 to be traversed.

In some cases, during the horizontal validation of the corresponding top pages 403, the mapper module 315 may encounter top pages 403 that are not otherwise reachable from the root pages 401, for example, due to a corruption in a corresponding root page 401. In such a case, while the top page 403 may be validated and the corresponding entry in the used-block data structure 900 is set, the entry in the vertically-verified data structure 1000 is not set.

In one example scenario, a root page 401 which is supposed to have a pointer to a given top page 403 has been corrupted. The given top page 403 is accessed during the horizontal traverse from another top page 403 based on a parent-child relationship. Once accessed, the given top page 403 is validated and the corresponding entry in the used-block data structure 900 is set. The namespace address and extent offset found in the back pointer of the given top page 403 are utilized to identify the root page 401 that corresponds to the given top page 403 and the index into that root page 401 that is supposed to contain a pointer to the given top page 403. In this example scenario, however, the index does not contain a pointer to the given top page 403 as expected, for example, due to a corruption of the root page 401. In this case, the entry corresponding to the given top page 403 in the vertically-verified data structure 1000 is not set.

Figure 11:
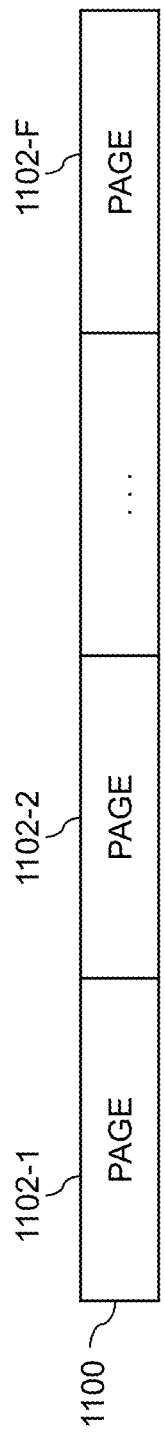
FIG. 11 shows an example repository of free pages in an illustrative embodiment.

With reference now to FIG. 11, a repository of free pages 1100, also referred to herein as freebin 1100, comprises entries 1102-1, 1102-2 . . . 1102-F which store pages that are available for re-allocation by garbage collection processes of the storage system. During the file system check process, the mapper module 315 walks through the pages found in the entries of the freebin 1100 and sets an entry corresponding to each page in a free-block data structure 1200 (FIG. 12) to indicate that the pages need to be checked as part of the file system check process.

Figure 12:
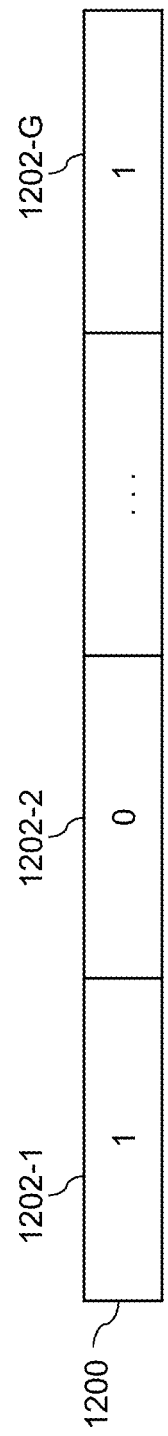
FIG. 12 shows an example free-block data structure in an illustrative embodiment.
Figure 13:
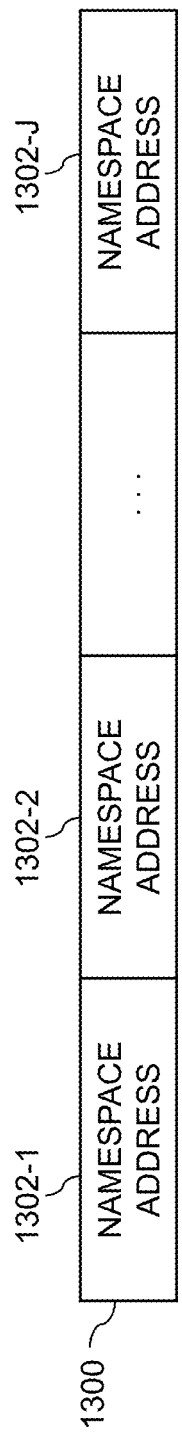
FIG. 13 shows an example orphan data structure in an illustrative embodiment.

With reference to FIG. 12, the free-block data structure 1200 is generated, for example, by the file system check tool of the mapper module 315 as part of the file system check process, and comprises a plurality of entries 1202-1, 1202-2 . . . 1202-G. In some embodiments, the free-block data structure 1200 comprises a bitmap and each entry 1202 comprise a corresponding bit of the bitmap. Each entry 1202 corresponds to one of the pages of the block tree structure. For example, as the mapper module 315 walks through the entries 1102 of the freebin 1100, the free-block data structure 1200 is generated where the entries 1202 in the free-block data structure 1200 that correspond to the pages found in each entry 1102 of the freebin 1100 are set. In some embodiments, both the used-block data structure 900 and free-block data structure 1200 comprise the same number of entries 902 and 1202 where each page of the block tree structure has a corresponding entry 902 and 1202 in each of the used-block data structure 900 and free-block data structure 1200.

The logical pages, e.g., top pages 403, mid pages 405, leaf pages 407, etc., are hosted on a meta-data tier of the storage system. As part of the file system check process, the mapper module 315 reads each page from the meta-data tier whose corresponding entry is not set in both the used-block data structure 900 and the free-block data structure 1200. For example, each page should have its corresponding entry set in either the used-block data structure or the free-block data structure 1200. If neither data structure has the corresponding entry set, this indicates that the page may be an orphan which requires further checking. In the case where such a page is a top page 403 and the namespace address in the back pointer is non-zero, the namespace address of the top page 403 is stored in an orphan data structure 1300 as shown, for example, in FIG. 13. Orphan data structure 1300 comprises entries 1302-1, 1302-2 . . . 1302-J which comprise the namespace addresses of top pages 403 which have been orphaned.

Once the used-block data structure 900, vertically-verified data structure 1000, free-block data structure 1200 and orphan data structure 1300 have been generated or populated, the mapper module 315 may perform a rebuild root process.

In the rebuild root process, mapper module 315 generates an aggregated set of top pages that comprises the list of top pages 403 found in the orphan data structure 1300 and all of the top pages 403 for which the corresponding entry 1002 in the vertically verified data structure 1000 has not been set. For example, the aggregated set of top pages comprises those top pages 403 that do not have a corresponding root page 401 that points to them.

The mapper module 315 traverses the aggregated set of top pages and utilizes the namespace address and extend offset information stored in the back pointers of each of these top pages 403 to identify the corresponding root pages 401 to which each top page belongs. For a given top page 403, the mapper module 315 reads the identified root page 401 and evaluates the corresponding index in the root page 401 where the pointer to the top page is supposed to reside, for example, based on the namespace address and extent offset found in the back pointer of the given top page 403.

As part of the evaluation, if the corresponding index in the root page 401 for the given top page 403 is empty, e.g., 0 or another pre-defined value, the pointer to the given top page 403 is added to the root page 401 at that index to reconnect the given top page 403 to the root page 401. The block tree structure associated with the re-connected top page 403 may then be browsed to update the metadata associated with the re-connected top page 403.

On the other hand, if the corresponding index in the root page 401 for the given top page 403 is not empty, e.g., contains another value such as a pointer to another top page 403, mapper module 315 uses the value at the index to read the other top page 403 and compares an instance-ID of the other top page 403 to an instance-ID of the given top page 403 to determine which top page comprises the most recent data. The instance-ID may comprise, for example, a timestamp or other indication which may be utilized to determine which top page is more recent.

If the given top page 403 comprises the most recent data, the given top page 403 is reconnected to the root page 401 at the root index, for example, by replacing the value in the index with the pointer to the given top page 403. The block tree structure associated with the re-connected given top page 403 may then be browsed to update the metadata associated with the block tree structure. In such a case, the block tree structure associated with the removed top page may be removed.

On the other hand, if the other top page 403 comprises the most recent data, the given top page 403 is not reconnected and mapper module 315 adds the namespace address of the given top page 403 to the freebin 1100 so that the given top page 403 may be re-allocated.

After all of the top pages 403 found in the aggregated set of top pages have been addressed by the mapper module 315 and either reconnected to the corresponding root page 401 or added to the freebin 1100, the rebuild root process will have been completed.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for reconstructing root pages will now be described in greater detail with reference to FIGS. 14 and 15. Although described in the context of system 100, these platforms may also be used to implement at least portions of other information processing systems in other embodiments.

Figure 14:
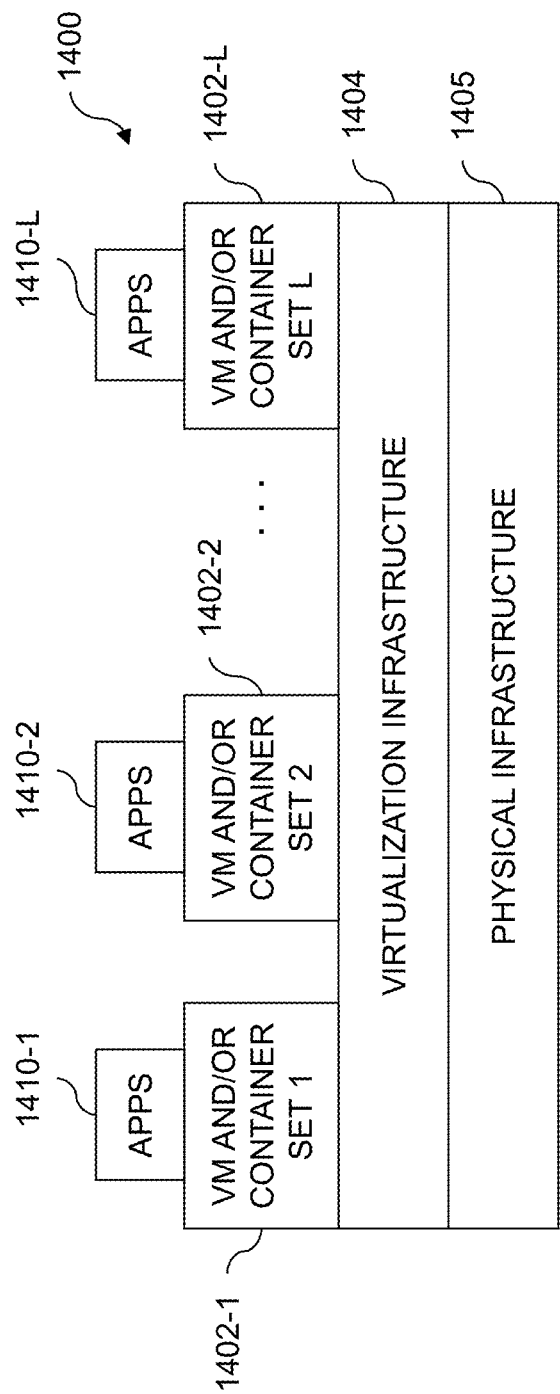
FIGS. 14 and 15 show examples of processing platforms that may be utilized to implement at least a portion of an information processing system in illustrative embodiments.
Figure 15:
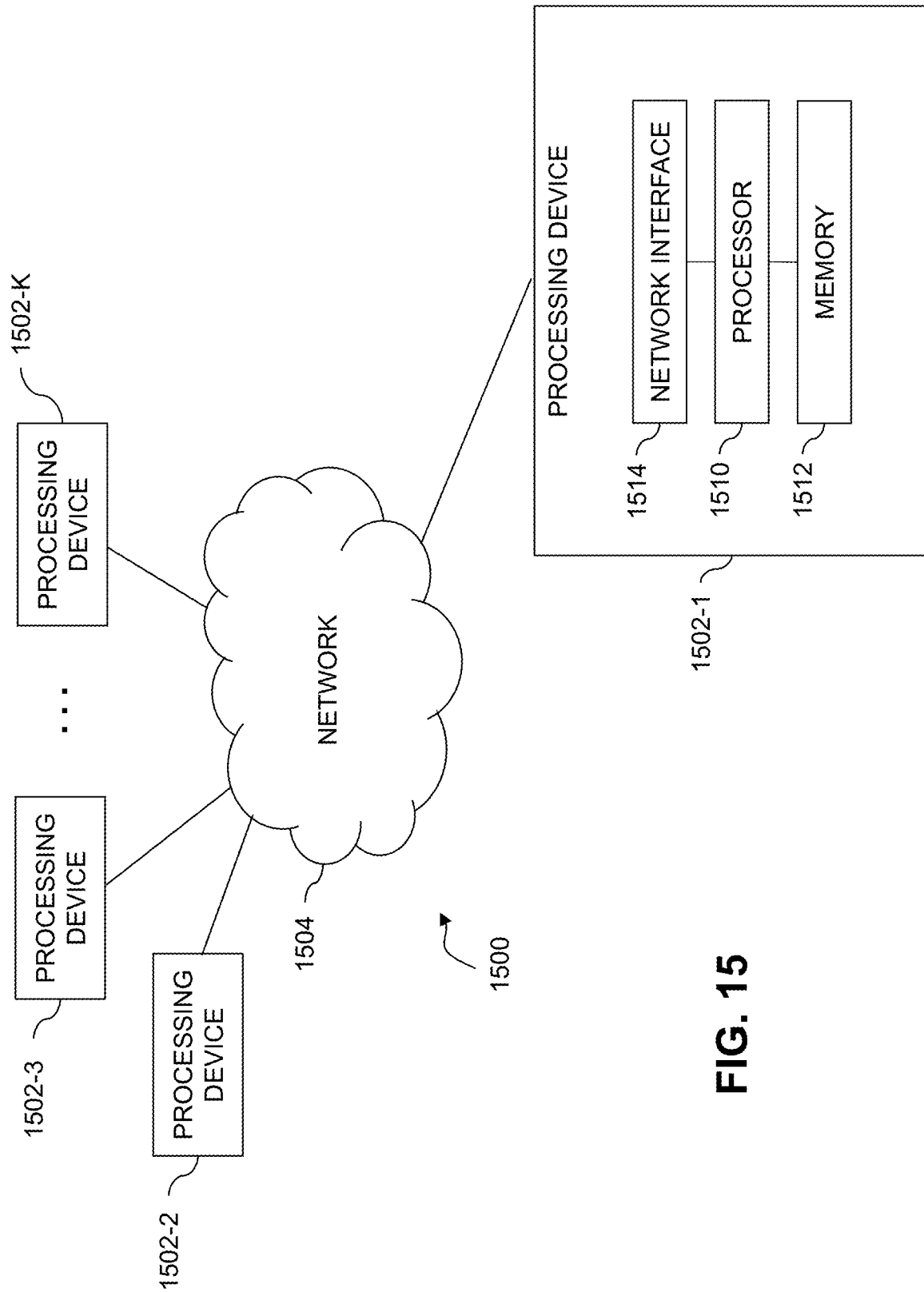

FIG. 14 shows an example processing platform comprising cloud infrastructure 1400. The cloud infrastructure 1400 comprises a combination of physical and virtual processing resources that may be utilized to implement at least a portion of the information processing system 100 in FIG. 1. The cloud infrastructure 1400 comprises multiple virtual machines (VMs) and/or container sets 1402-1, 1402-2, . . . 1402-L implemented using virtualization infrastructure 1404. The virtualization infrastructure 1404 runs on physical infrastructure 1405, and illustratively comprises one or more hypervisors and/or operating system level virtualization infrastructure. The operating system level virtualization infrastructure illustratively comprises kernel control groups of a Linux operating system or other type of operating system.

The cloud infrastructure 1400 further comprises sets of applications 1410-1, 1410-2, . . . 1410-L running on respective ones of the VMs/container sets 1402-1, 1402-2, . . . 1402-L under the control of the virtualization infrastructure 1404. The VMs/container sets 1402 may comprise respective VMs, respective sets of one or more containers, or respective sets of one or more containers running in VMs.

In some implementations of the FIG. 14 embodiment, the VMs/container sets 1402 comprise respective VMs implemented using virtualization infrastructure 1404 that comprises at least one hypervisor. A hypervisor platform may be used to implement a hypervisor within the virtualization infrastructure 1404, where the hypervisor platform has an associated virtual infrastructure management system. The underlying physical machines may comprise one or more distributed processing platforms that include one or more storage systems.

In other implementations of the FIG. 14 embodiment, the VMs/container sets 1402 comprise respective containers implemented using virtualization infrastructure 1404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1400 shown in FIG. 14 may represent at least a portion of one processing platform. Another example of such a processing platform is processing platform 1500 shown in FIG. 15.

The processing platform 1500 in this embodiment comprises a portion of system 100 and includes a plurality of processing devices, denoted 1502-1, 1502-2, 1502-3, . . . 1502-K, which communicate with one another over a network 1504.

The network 1504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1502-1 in the processing platform 1500 comprises a processor 1510 coupled to a memory 1512.

The processor 1510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1512 may comprise random access memory (RAM), read-only memory (ROM), flash memory or other types of memory, in any combination. The memory 1512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for reconstructing root pages as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage devices, tree structures, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising at least one processing device comprising a processor coupled to a memory, the at least one processing device being configured:
   to obtain a first logical page of a logical address space comprising a plurality of logical pages;
   to obtain a first namespace address corresponding to a second logical page of the logical address space from the first logical page;
   to obtain the second logical page based at least in part on the first namespace address, the second logical page comprising a plurality of entries;
   to identify a given entry of the plurality of entries of the second logical page based at least in part on index information contained in the first logical page;
   to determine that the given entry comprises data other than a second namespace address corresponding to the first logical page; and
   to add the second namespace address corresponding to the first logical page to the given entry based at least in part on the determination that the given entry comprises data other than the second namespace address.

2. The apparatus of claim 1 wherein determining that the given entry comprises data other than the second namespace address corresponding to the first logical page comprises determining that the given entry is empty.

3. The apparatus of claim 1 wherein:
   determining that the given entry comprises data other than the second namespace address corresponding to the first logical page comprises determining that the given entry comprises a third namespace address;
   the at least one processing device is further configured:
      to obtain a third logical page based at least in part on the third namespace address; and
      to determine that the first logical page is more recent than the third logical page; and
   adding the second namespace address of the second logical page to the given entry based at least in part on the determination that the given entry comprises data other than the second namespace address comprises replacing the third namespace address with the second namespace address in the given entry based at least in part on the determination that the first logical page is more recent than the third logical page.

4. The apparatus of claim 1 wherein:
   the at least one processing device is further configured to perform a file system check process, the file system check process comprising:
      obtaining the second logical page;
      determining that the second logical page is corrupted; and formatting the second logical page based at least in part on the determination that the second logical page is corrupted; and obtaining the second logical page based at least in part on the first namespace address comprises obtaining the formatted second logical page.

5. The apparatus of claim 1 wherein:

the at least one processing device maintains a logical address space organized as a tree structure comprising a plurality of logical page levels;

a first logical page level of the plurality of logical page levels comprises the first logical page; and a second logical page level of the plurality of logical page levels comprises the second logical page.

6. The apparatus of claim 5 wherein:

the at least one processing device is further configured to perform a file system check process, the file system check process comprising:

obtaining a fourth logical page, the second logical page level comprising the fourth logical page;

obtaining a fourth namespace address corresponding to a fifth logical page from the fourth logical page, the first logical page level comprising the fifth logical page;

obtaining the fifth logical page based at least in part on the obtained fourth namespace address; and identifying a parent-child relationship between the fifth logical page and the first logical page;

obtaining the second namespace address from the fifth logical page based at least in part on the parent-child relationship;

obtaining the first logical page based at least in part on the second namespace address obtained from the fifth logical page; and determining that the first logical page has not been reached from a corresponding logical page of the second logical page level; and obtaining the first logical page of the logical address space comprises obtaining the first logical page of the logical address spaces based at least in part on the determination that the first logical page has not been reached from the corresponding logical page of the second logical page level.

7. The apparatus of claim 6 wherein the file system check process further comprises:

marking a first entry that corresponds to the fifth logical page in a first data structure with an indication that the fifth logical page is in use based at least in part on obtaining the fifth logical page;

marking a second entry that corresponds to the fifth logical page in a second data structure with an indication that the fifth logical page is vertically verified based at least in part on the fourth namespace address being obtained from of the fourth logical page of the second logical page level; and marking a third entry that corresponds to the first logical page in the first data structure with an indication that the first logical page is in use based at least in part on obtaining of the first logical page; and wherein a fourth entry in the second data structure that corresponds to the first logical page is not marked based at least in part on the determination that the first logical page has not been reached from a corresponding logical page of the second logical page level.

8. A method comprising:

obtaining a first logical page of a logical address space comprising a plurality of logical pages;

obtaining a first namespace address corresponding to a second logical page of the logical address space from the first logical page;

obtaining the second logical page based at least in part on the first namespace address, the second logical page comprising a plurality of entries;

identifying a given entry of the plurality of entries of the second logical page based at least in part on index information contained in the first logical page;

determining that the given entry comprises data other than a second namespace address corresponding to the first logical page; and adding the second namespace address corresponding to the first logical page to the given entry based at least in part on the determination that the given entry comprises data other than the second namespace address;

wherein the method is performed by at least one processing device comprising a processor coupled to a memory.

9. The method of claim 8 wherein determining that the given entry comprises data other than the second namespace address corresponding to the first logical page comprises determining that the given entry is empty.

10. The method of claim 8 wherein:

determining that the given entry comprises data other than the second namespace address corresponding to the first logical page comprises determining that the given entry comprises a third namespace address;

the method further comprises:

obtaining a third logical page based at least in part on the third namespace address; and determining that the first logical page is more recent than the third logical page; and adding the second namespace address of the second logical page to the given entry based at least in part on the determination that the given entry comprises data other than the second namespace address comprises replacing the third namespace address with the second namespace address in the given entry based at least in part on the determination that the first logical page is more recent than the third logical page.

11. The method of claim 8 wherein:

the method further comprises performing a file system check process, the file system check process comprising:

obtaining the second logical page;

determining that the second logical page is corrupted; and formatting the second logical page based at least in part on the determination that the second logical page is corrupted; and obtaining the second logical page based at least in part on the first namespace address comprises obtaining the formatted second logical page.

12. The method of claim 8 wherein:

the method further comprises maintaining a logical address space organized as a tree structure comprising a plurality of logical page levels;

a first logical page level of the plurality of logical page levels comprises the first logical page; and a second logical page level of the plurality of logical page levels comprises the second logical page.

13. The method of claim 12 wherein:

the method further comprises performing a file system check process, the file system check process comprising:

obtaining a fourth logical page, the second logical page level comprising the fourth logical page; obtaining a fourth namespace address corresponding to a fifth logical page from the fourth logical page, the first logical page level comprising the fifth logical page;

obtaining the fifth logical page based at least in part on the obtained fourth namespace address; and identifying a parent-child relationship between the fifth logical page and the first logical page;

obtaining the second namespace address from the fifth logical page based at least in part on the parent-child relationship;

obtaining the first logical page based at least in part on the second namespace address obtained from the fifth logical page; and determining that the first logical page has not been reached from a corresponding logical page of the second logical page level; and obtaining the first logical page of the logical address space comprises obtaining the first logical page of the logical address spaces based at least in part on the determination that the first logical page has not been reached from the corresponding logical page of the second logical page level.

14. The method of claim 13 wherein the file system check process further comprises: marking a first entry that corresponds to the fifth logical page in a first data structure with an indication that the fifth logical page is in use based at least in part on obtaining the fifth logical page;

marking a second entry that corresponds to the fifth logical page in a second data structure with an indication that the fifth logical page is vertically verified based at least in part on the fourth namespace address being obtained from of the fourth logical page of the second logical page level; and marking a third entry that corresponds to the first logical page in the first data structure with an indication that the first logical page is in use based at least in part on obtaining of the first logical page; and wherein a fourth entry in the second data structure that corresponds to the first logical page is not marked based at least in part on the determination that the first logical page has not been reached from a corresponding logical page of the second logical page level.

15. A computer program product comprising a non-transitory processor-readable storage medium having stored therein program code of one or more software programs, wherein the program code when executed by at least one processing device causes the at least one processing device:

to obtain a first logical page of a logical address space comprising a plurality of logical pages;

to obtain a first namespace address corresponding to a second logical page of the logical address space from the first logical page;

to obtain the second logical page based at least in part on the first namespace address, the second logical page comprising a plurality of entries;

to identify a given entry of the plurality of entries of the second logical page based at least in part on index information contained in the first logical page;

to determine that the given entry comprises data other than a second namespace address corresponding to the first logical page; and to add the second namespace address corresponding to the first logical page to the given entry based at least in part on the determination that the given entry comprises data other than the second namespace address.

16. The computer program product of claim 15 wherein determining that the given entry comprises data other than the second namespace address corresponding to the first logical page comprises determining that the given entry is empty.

17. The computer program product of claim 15 wherein:
determining that the given entry comprises data other than the second namespace address corresponding to the first logical page comprises determining that the given entry comprises a third namespace address;

the program code further causes the at least one processing device:

to obtain a third logical page based at least in part on the third namespace address; and to determine that the first logical page is more recent than the third logical page; and adding the second namespace address of the second logical page to the given entry based at least in part on the determination that the given entry comprises data other than the second namespace address comprises replacing the third namespace address with the second namespace address in the given entry based at least in part on the determination that the first logical page is more recent than the third logical page.

18. The computer program product of claim 15 wherein:
the program code further causes the at least one processing device to perform a file system check process, the file system check process comprising:

obtaining the second logical page;

determining that the second logical page is corrupted; and formatting the second logical page based at least in part on the determination that the second logical page is corrupted; and obtaining the second logical page based at least in part on the first namespace address comprises obtaining the formatted second logical page.

19. The computer program product of claim 15 wherein:
the at least one processing device maintains a logical address space organized as a tree structure comprising a plurality of logical page levels;

a first logical page level of the plurality of logical page levels comprises the first logical page; and a second logical page level of the plurality of logical page levels comprises the second logical page;

the program code further causes the at least one processing device to perform a file system check process, the file system check process comprising:

obtaining a fourth logical page, the second logical page level comprising the fourth logical page;

obtaining a fourth namespace address corresponding to a fifth logical page from the fourth logical page, the first logical page level comprising the fifth logical page;

obtaining the fifth logical page based at least in part on the obtained fourth namespace address; and identifying a parent-child relationship between the fifth logical page and the first logical page;

obtaining the second namespace address from the fifth logical page based at least in part on the parent-child relationship;

obtaining the first logical page based at least in part on the second namespace address obtained from the fifth logical page; and determining that the first logical page has not been reached from a corresponding logical page of the second logical page level; and obtaining the first logical page of the logical address space comprises obtaining the first logical page of the logical address spaces based at least in part on the determination that the first logical page has not been reached from the corresponding logical page of the second logical page level.

20. The computer program product of claim 19 wherein the file system check process further comprises:
- marking a first entry that corresponds to the fifth logical page in a first data structure with an indication that the fifth logical page is in use based at least in part on obtaining the fifth logical page;
- marking a second entry that corresponds to the fifth logical page in a second data structure with an indication that the fifth logical page is vertically verified based at least in part on the fourth namespace address being obtained from of the fourth logical page of the second logical page level; and
- marking a third entry that corresponds to the first logical page in the first data structure with an indication that the first logical page is in use based at least in part on obtaining of the first logical page; and
- wherein a fourth entry in the second data structure that corresponds to the first logical page is not marked based at least in part on the determination that the first logical page has not been reached from a corresponding logical page of the second logical page level.

\* \* \* \* \*